United States Patent [19]

Dwyer et al.

[11] Patent Number: 4,688,117
[45] Date of Patent: Aug. 18, 1987

[54] DISPLAY INCLUDING VARIABLE MODE FOR A RECORD AND/OR PLAYBACK DEVICE

[75] Inventors: John J. Dwyer, Stratford; Jeremy Saltzman, Norwalk; Betsy Hipp, Orange, all of Conn.

[73] Assignee: Dictaphone Corporation, Rye, N.Y.

[21] Appl. No.: 564,480

[22] Filed: Dec. 21, 1983

[51] Int. Cl.⁴ .................. G11B 15/18; G11B 27/13; G11B 27/34

[52] U.S. Cl. ................... 360/72.3; 360/72.1; 360/137; 369/69; 369/27

[58] Field of Search .............. 360/72.1–72.3, 360/79, 137, 74.1, 74.2, 13, 14.1–14.3, 74.4, 71; 369/25, 27, 28, 69; 179/6.09; 379/73, 75

[56] References Cited

U.S. PATENT DOCUMENTS

| | | | |
|---|---|---|---|
| 3,671,683 | 6/1972 | Rahenkamp et al. | 369/27 |
| 3,749,849 | 7/1973 | Kolpek et al. | 369/27 |
| 3,921,220 | 11/1975 | Primosch et al. | 360/72.3 |
| 3,988,778 | 10/1976 | Swenson | 360/72.1 |
| 4,177,488 | 12/1979 | Sakai | 360/72.3 |
| 4,200,893 | 4/1980 | Matison | 369/28 |
| 4,210,785 | 7/1980 | Huber et al. | 360/72.2 |
| 4,224,644 | 9/1980 | Lewis et al. | 360/72.2 |
| 4,225,890 | 9/1980 | Takenaka et al. | 360/72.1 |
| 4,352,173 | 9/1982 | Titus, IV et al. | 369/27 |
| 4,386,379 | 5/1983 | Smith et al. | 360/72.3 |
| 4,398,279 | 8/1983 | Titus, IV et al. | 369/27 |
| 4,410,923 | 10/1983 | Patel | 360/72.3 |
| 4,469,919 | 9/1984 | Nakamura et al. | 179/6.01 |

FOREIGN PATENT DOCUMENTS

57-186280  11/1982  Japan .................. 360/72.1

Primary Examiner—Raymond F. Cardillo
Assistant Examiner—Steven R. Garland
Attorney, Agent, or Firm—Robert H. Whisker; Melvin J. Scolnick; David E. Pitchenik

[57] ABSTRACT

A variable mode numerical display for a record/playback device normally displays a numerical count representing the present position of the record medium used with that device and is operable to interrupt this normal display so as to display the number of a message that was last-recorded or that is in position for playback or to display the number of an instruction that was last-recorded or that has been reached. Also, a bar graph display is comprised of plural visual display elements which are selectively energized as a function of the interval that separates successive pulses that are generated in conjunction with the movement of the record medium. The variable mode and bar graph displays are controlled by a processor.

48 Claims, 14 Drawing Figures

DISPLAY INCLUDING VARIABLE MODE FOR A RECORD AND/OR PLAYBACK DEVICE

BACKGROUND OF THE INVENTION

This invention relates to a display for a record/playback device and, more particularly, to such a display that indicates to the user the present position of the record medium used with that device as well as numerical indications regarding the number of a message or instruction which has been recorded or which is in position for playback.

The invention disclosed herein is usable with a device of a type described in co-pending application Ser. No. 564,191, filed Dec. 21, 1983.

In many record/playback devices, such as dictation/transcription machines, it is desirable to provide indications of different types of information recorded thereon. Typically, these indications have been categorized broadly as "letter" or "message" indications, referring to the relative location of the end (or beginning) of a letter or message, and "instruction" indications referring to the relative location of a dictated instruction. In addition, these devices typically are provided with an indication of the present position of the record medium used therewith as that medium is transported for recording, playback, fast-forward and reverse movement. The letter (or message) and instruction indications generally are helpful both to the dictator who is in the process of recording and reviewing information and a transcriptionist who transcribes the messages which the dictator has recorded.

It has been common to provide various displays of the aforenoted letter (or message), instruction and present-position indications directly on the recording/reproducing device. In earlier devices, letter and instruction indications have been provided by suitable marks scribed on an index slip as the message is recorded; and present-position indications have been provided by mechanical counters incremented or decremented with the movement of the record medium and also by mechanical pointers traversing an index scale. In these devices, when the record medium is loaded into a transcribing machine for transcription of the recorded messages, the prepared index slip also must be loaded into that machine so as to apprise the operator of the relative locations of the letters (or messages) and instructions which have been recorded.

An improvement to the use of such scribed index slips for indicating the locations of letters (or messages) and instructions has been developed, whereby "letter" and "instruction" signals (referred to herein as "cue" signals) are electronically recorded on the very same record medium upon which the dictated messages are recorded. The cue signals are of a predetermined frequency to be detected electronically when the record medium is advanced. One such system is disclosed in U.S. Pat. No. 4,051,540, wherein visual indicators are selectively energized to provide appropriate indications of the locations of such recorded cue signals. An improvement to the system described in the aforementioned patent is disclosed in U.S. Pat. No. 4,200,893, wherein the visual indicators are controlled by a digital processor, such as a microprocessor. A still further improvement is disclosed in U.S. Pat. No. 4,378,577.

In the aforementioned patents, the "letter" and "instruction" indications are displayed by suitable arrays of visual indicators, such as linear arrays wherein each visual indicator represents a quantity, or length of record medium and is selectively energized to apprise the user of the relative location on that medium of the recorded letter or instruction. U.S. Pat. No. 4,378,577 also describes the use of an additional numerical display which provides a numerical indication (e.g. in terms of time, such as minutes) of the present position of the record medium.

It also has been proposed to utilize a so-called "shutter" display wherein a number of contiguous visual indicators are energized to display the present position of a recording tape. The shutter display is accompanied by separate tape-length and letter-length displays which provide respective numerical indications of the total length of tape that has been transported and the total length of each separate letter that has been recorded. Although the length of each letter may be indicated, one disadvantage attending this proposal is the failure to indicate the number of the letter, or message, which has been recorded or which is in position for playback. For example, if the dictator has recorded a number of messages but then wishes to revise message number 2, there is no simple numerical display apprising the dictator when the tape has been reversed and message number 2 has been reached. Similarly, if a number of separate instructions are recorded, the user is not provided with a simple numerical display of the number of the instruction that has been reached by transporting the tape thereto.

As described in aforementioned copending application Ser. No. 564,191, a miniaturized record/playback device has been proposed with microprocessor-control over the various operating functions thereof. Notwithstanding the small size of this record/playback device, it is advantageous to provide therein a suitable display by which the user is apprised of the present position of the record medium used therewith, the number of the particular letter, or message, which is being recorded or played back, the number of the particular instruction which is being recorded or which as been reached, and the mode of operation of the device. However, because of the small overall size of the device, the aforementioned display desirably is operable in various different modes such that the same display elements are used to apprise a user of different information. For example, a common numerical display is used to display, in one mode, a numerical count representing the present position of the record medium, and in another mode this numerical display operates to display the number of the message which was last-recorded or which is in position for playback. Furthermore, this same numerical display is additionally operable to display the number of an instruction being recorded or the number of the recorded instruction that has been reached. Thus, the user of the device is readily apprised of the particular letter, or message, in position for playback (or recording), and may rapidly scan the record medium to revise or review a particular message or instruction. Hence, the disadvantages attending the aforenoted total-length and letter-length displays are overcome and, moreover, a common numerical display is utilized to provide valuable information regarding the present position of and present message on the record medium.

U.S. Pat. No. 4,410,923 describes an array of light indicating elements for use in a record/playback device wherein successive elements are energized when predetermined incremental-quantities of information are recorded on a movable record medium. For example, when information is recorded on a magnetic tape transportable between supply and take-up reels, it is known that the angular velocity of, for example, the supply reel varies as a function of the amount of tape wound thereby. It is conventional to generate pulses as the supply (or take-up) reel rotates and to use these pulses to increment both a tape-length counter and a "time-line" indicator. However, since the interval between successive pulses is reduced as the radius of the supply reel decreases, an accurate time-line display should not be based merely on the number of such pulses which are counted. In the aforementioned patent, a microprocessor-controlled technique is described for "linearizing" these pulses such that a pulse count is produced which more accurately represents a linear quantity of tape that has been transported rather than the number of rotations that the supply (or take-up) reel has undergone. It is advantageous, in the present invention, to provide a similar "linearizing" effect by employing a simpler microprocessor-controlled technique, notwithstanding the fact that, in a reel-to-reel tape transport, the rate at which pulses are generated as the supply (or take-up) reel rotates changes as the radius of that reel changes.

OBJECTS OF THE INVENTION

Therefore, it is an object of the present invention to provide improved processor-controlled displays for a record/playback device.

Another object of this invention is to provide a variable mode display for such a device, the display operating in one mode to provide a numerical representation of the present position of the record medium used with that device, and operable in another mode to identify particular cue signal indications representing, for example, the number of a message which is recorded or which is in position for playback or the number of an instruction which is recorded or which has been reached for review.

A further object of this invention is to provide an improved display of the aforementioned type, and further including a bar graph display to represent the present position of the record medium used with that device.

An additional object of this invention is to provide a bar graph display of the aforementioned type which is used with a magnetic tape record and/or playback device, the bar graph being comprised of plural energizable elements, each being energized when approximately the same length of tape is transported from one reel to the other.

Yet another object of this invention is to provide a processor-controlled display for a record and/or playback device to provide a bar graph representation of the present position of the record medium, to provide a numerical representation of that present position, and to provide a numerical representation of the particular message or instruction which has been recorded or which is in position for playback.

It is still another object of this invention to provide a processor-controlled display that operates without detecting the presence of cue signals, to provide a numerical indication of the particular letter, message or instruction which has been recorded or which is in position for playback.

A still further object of this invention is to provide a bar graph display of the aforementioned type, wherein pulses are generated as the record medium is transported, and wherein the display includes a processor for measuring the interval between successive pulses and for controlling the energization of the bar graph display as a function of an averaged interval measurement.

Various other objects, advantages and features of the present invention will become readily apparent from the ensuing detailed description, and the novel features will be particularly pointed out in the appended claims.

SUMMARY OF THE INVENTION

In accordance with this invention, a record and/or playback devices is provided with a variable mode display which, under processor control, operates in one mode to display a numerical representation of the present position of the record medium used therewith and operates in another mode to display a numerical representation of the message or instruction which has been recorded or which is in position for playback. Advantageously, the particular display mode is manually selectable or is determined as a function of the particular mode of operation of the device.

In accordance with one advantageous feature of the present invention, the record/playback device also is provided with a bar graph display which provides a graphical representation of the present position of the record medium. The bar graph display is comprised of a plurality of energizable elements selectively energized as a function of the measured separation between successive pulses which are generated as the record medium is transported. It is one aspect of this feature to average a predetermined number of measured pulse-separations and to use the average separation to energize the appropriate bar graph display element.

In accordance with another feature of this invention, the variable mode display normally provides a numerical indication of the present position of the record medium and, when the end of a message or an instruction is recorded, this present position display is interrupted to display the number of the message or instruction which has been recorded. The display is selectively operable such that when the record medium is transported at a relatively high speed, the numerical display indicates the number of the message then present on the record medium and, when an instruction is reached, the number of that instruction is displayed. In one aspect of this feature, a memory comprised of addressable storage locations stores the counts of a counter, the latter being incremented and decremented as the record medium is transported, the stored counts representing the locations at which ends of messages and instructions are recorded. Advantageously, the counts are stored in sequential storage locations which are addressed by an address that is incremented when a new and end-of-message or instruction is provided and is also incremented and decremented when the record medium is advanced and reversed, respectively, past a location at which such ends-of-messages and instructions are recorded. Preferably, the numerical display of the message or instruction which has been recorded or is in position for playback is derived from the generated address. It is an aspect of this feature to insert into the memory, at a storage location in between storage locations at which counts are stored, a further count representing the location on the record medium at which an additional end-of-message or an additional instruction is inserted, and to adjust the addresses of the storage locations accordingly.

BRIEF DESCRIPTION OF THE DRAWINGS

The following detailed description, given by way of example and not intended to limit the invention solely to the illustrated embodiments, should be read in conjunction with the accompanying drawings in which.

DETAILED DESCRIPTION OF A PREFERRED EMBODIMENT

The present invention, now to be described, is particularly adapted for use in a portable, battery-operated dictate device. However, as will be apparent, this invention is equally applicable to a sound recorder that may be used for other applications and need not be limited solely for use as a dictate machine. Also, and as will be apparent, the present invention may be used to control the displays of a playback device which operates merely to reproduce pre-recorded information. Still further, the record/playback device described herein preferably is used with a miniature, thumb-sized, capstan-driven magnetic tape cassette, such as the tape cassette described in copending application Ser. No. 388,539, now U.S. Pat. No. 4,476,510, and copending application Ser. No. 388,540, now U.S. Pat. No. 4,443,827. However, it should be readily appreciated that, if desired, the record/playback device described herein need not be limited solely for use with magnetic tape cassettes but, rather, may be used with other record media, such as magnetic discs which may be rotatably driven and may be selectively engaged by a magnetic head that is moved in the forward and reverse directions. Also, the record medium may comprise a bubble-memory device wherein forward and reverse "movements" are simulated by forward and reverse shifting of "bubbles" which, as is known, represent information. Similarly, the record medium may comprise a solid state memory "chip" wherein movements are simulated by shifting the addresses of locations in which digitized information is written and read. As used herein, the expression "movable record medium" is intended to include the foregoing media and other analogous media for recording/reproducing or storing/reading information.

The Record/Playback Device

Figure 1:
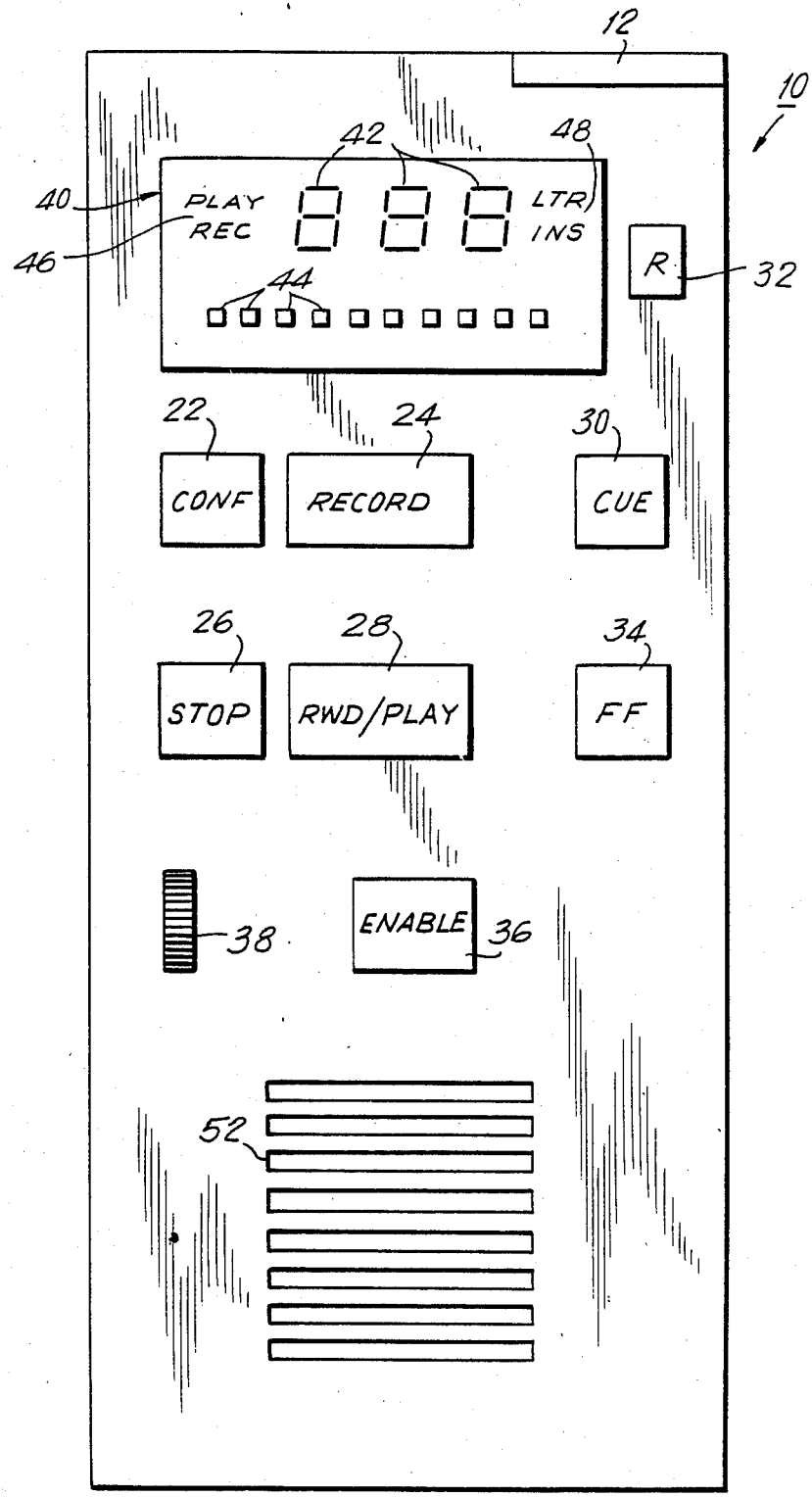
FIG. 1 is a schematic representation of a front view of one embodiment of the record/playback device in which the present invention may be used.

For convenience, the record/playback device is described herein in the context of a portable, battery-operated dictate machine. As shown in FIG. 1, device 10 is provided with a plurality of manually operable controls, plural displays, a microphone 12 (illustrated, as an example, at the upper right-hand corner of the device) and a speaker 52. In one embodiment, the manually operable controls comprise push-button elements, each being selectively operable to control or initiate a corresponding function. Alternatively, these controls may be formed as touch-sensitive switches adapted to produce signals representing the actuation thereof when touched by the user of the device. In either embodiment, a respective signal is produced in response to the operation of a corresponding control element, and this signal is produced for so long as that element is operated. Upon release of the element, the signal terminates. Suitable push-buttons, switches and the like for providing these functions are conventional and are well known.

The displays, identified as displays 40, preferably are formed as LCD display devices which, as is conventional, require relatively little electrical energy to provide suitable indications; and, thus, advantageously impose little drain on the electrical storage battery which is used to energize device 10. Alternatively, other visual indicator display devices, such as LED devices, electroluminescent devices, and the like may be used to implement display 40.

Although not shown in FIG. 1, it will be appreciated that, in the embodiment described herein, device 10 is operable with a removable record medium. As mentioned above, this record medium preferably comprises a miniature, thumb-sized tape cassette. On the reverse, or backside of device 10 (not shown) there is provided a door to a cassette-receiving compartment in which the cassette is contained for operation. A suitable switch (also not shown) may be coupled to this door or may be contacted by a cassette loaded into the cassette compartment so as to produce a suitable signal when the cassette is removed. As will be described below, this switch functions to sense the ejection of the cassette and is referred to sometimes herein as an "eject" button.

The manual controls provided with record/playback device 10 include a conference record button, or switch, 22, a momentary record button, or switch, 24, a stop button, or switch, 26, a rewind/play button, or switch, 28, a cue/erase button, or switch, 30, a reset/mode button, or switch, 32, a fast forward button, or switch, 34 and a keyboard enable button, or switch, 36. For convenience, these elements are referred to merely as buttons. In addition, a volume adjustment control knob 38, such as a potentiometer, also is provided.

Conference record button 22 and momentary record button 24 are manually operable to dispose record/playback device 10 in the so-called "conference record" and "momentary record" modes of operation, respectively. When disposed in the conference record mode, the gain in the recording electronics is increased such that device 10 can be used to record a "conference" among individuals who are disposed at some distance from microphone 12. In the momentary record mode, the gain of the recording electronics is reduced, thus making the pick-up sensitivity of the device less sensitive. In the momentary record mode, it is expected that the user will hold device 10 in close proximity to his mouth. With reduced pick-up sensitivity, ambient noises will not be recorded and, thus, such noises will not interfere with the user's dictation. Furthermore, the operation of record button 24 establishes the momentary record mode for so long as this button is operated. Upon release of the record button, the mode of device 10 is changed over to an inactive, or stop, mode. However, when conference record button 22 is operated, the conference record mode is established, and this mode remains "latched" even when the conference record button is released.

Rewind/play button 28 is adapted, when operated, to dispose device 10 in a rewind mode, whereby the magnetic tape is driven in the reverse direction at a relatively high rate of speed. Upon release of button 28, the direction in which the tape is driven is reversed, and the rate at which the tape now is moved in the forward direction is reduced to the speed at which information can be played back. It is appreciated that this speed is equal to the speed at which the tape is driven when either conference record button 22 or momentary record button 24 is operated. Stop button 26, when operated, functions to change over device 10 from an active mode (e.g. record, play, etc.) to an inactive, or stop mode. It is appreciated that, in this inactive or stop mode, the tape is maintained stationary.

Cue/erase button 30 is adapted, when operated momentarily, to record a "cue" signal on the magnetic tape and, additionally, to provide a cue indication which represents the location along the tape at which the cue signal is recorded. As will be described below, this cue indication enables the user to rapidly move the tape in either the rewind or fast forward modes to the location at which that cue signal is recorded. Preferably, cue indications representing "letter" and "instruction" cues, respectively, may be recorded by selectively operating the cue button. For example, the "letter" cue indication is provided, and a corresponding "letter" cue signal is recorded, upon a single momentary operation of cue button 30. This designates the end of a letter, or message, or segment of dictation, that has been recorded. Upon a repeated momentary operation of the cue button within a predetermined time period, for example, if the cue button is operated twice within a period of 1 second, an "instruction" cue is indicated and recorded to designate the location of a recorded instruction.

As will be described below, display 40 includes a plural-digit (e.g. a 3-digit) numerical display 42 which normally functions as a tape counter to provide a numerical indication of the amount of tape which has been transported, thereby representing the present position of the tape. Reset/mode button 32 is adapted, when operated or pushed for a prolonged period of time, to reset numerical display 42. When the reset/mode button is operated momentarily, the information displayed by numerical display 42 is changed over, or toggled, to display the number of the letter, or message that has been recorded, and/or the number of the particular letter or message which is in position to be (or is in the process of being) played back. Also, if device 10 is in its record or fast forward or rewind mode, numerical display 42 displays the number of the instruction that has been recorded or that has been reached, respectively.

Fast forward button 34, when operated, functions to dispose device 10 in its fast forward mode in which the magnetic tape is transported at a relatively rapid speed in the forward direction. In this mode, when the tape has been transported to the end of a letter (or message) or to a location at which an instruction had been recorded, the tape transport provided in device 10 is temporarily interrupted so as to "pause" at that location and the number of the letter or instruction which has been reached is displayed. Hence, the tape may be rapidly transported to the location of a letter or an instruction. Similarly, the tape may be rapidly transported in the reverse direction to a letter or instruction upon the operation of rewind/play button 28. That is, when device 10 is disposed in the rewind mode of operation, the tape is rapidly rewound until the end of a letter (or message) or the location at which an instruction had been recorded is reached, whereupon the tape transport "pauses" thereat and the number of that letter or instruction is displayed.

Enable button 36, sometimes referred to herein as a keyboard enable button, functions in a manner analogous to a POWER ON switch. Device 10 is provided with a programmed microprocessor which is responsive to the selective actuation of the illustrated control buttons to control both the operation of the device and the information displayed by display 40. The manner in which this microprocessor operates will be described in greater detail below. When not in use, device 10 and the microprocessor therein are disposed in a dormant, or non-operating condition. When the device is to be operated by the user, enable button 36 is operated so as to change over the device from its dormant condition to an inactive mode, thus awaiting subsequent actuation of a control button. As will be described below, when device 10 is disposed in its inactive mode, which corresponds to a "stop" mode, both the device and the microprocessor will change over to the dormant condition automatically if no active mode is initiated within a predetermined time period. Stated otherwise, when the device is disposed in its stop mode, it will revert to its dormant condition unless conference record button 22, momentary record button 24, rewind/play button 28 or fast forward button 34 is operated within the aforementioned time period. The operation of enable button 36 will bring the microprocessor out of the dormant condition.

As mentioned above, display 40 is provided with a plural-digit numerical display 42. As one example thereof, numerical display 42 may be comprised of a 3-digit display, each digit being represented by a 7-segment LCD element or other conventional visual indication numerical display device. This numerical display is adapted to be incremented and decremented as the tape is driven so as to provide a numerical indication of the amount of tape which has been transported.

Display 40 also is provided with a bar graph, or index, display 44, a "record/play" indicator 46, and a "letter/instruction" indicator 48. Bar graph display 44 is comprised of a plurality of individual elements or segments, such as LCD segments, which are adapted to be selectively energized to provide an indication of the approximate quantity of tape which has been transported, thereby providing a bar graph display of the present position of the tape. As an example, if bar graph display 44 is formed of ten segments, each segment may represent approximately 10% of the overall length of tape; and as successive tape is transported in the forward direction, additional ones of segments 44 are energized. Preferably, the segments which comprise the bar graph display are selectively energized to provide a left-to-right shifting effect when device 10 is disposed in the fast forward mode; and these segments are energized to provide a right-to-left shifting effect when the device is disposed in its rewind mode.

"Record/play" indicator 46 is adapted to be energized to display REC when device 10 is disposed in its record mode and to display PLAY when the device is disposed in its playback mode. This provides the user with an indication of the particular mode of operation in which the device is disposed. "Letter/instruction" indicator 48 is adapted to display LTR when a letter cue signal is recorded and to display INS when an instruction cue signal is recorded. Also, upon the momentary operation of reset/mode button 32, the indication LTR is displayed together with a numerical indication by display 42 to indicate the number of the particular letter then juxtaposed the record/playback head of device 10. Additionally, when the record medium with which device 10 is used is rewound or advanced rapidly to the end of a previously recorded letter, or to a previously recorded instruction, the indication LTR or INS, respectively, and the number of that letter or instruction which has been accessed are displayed.

In the preferred embodiment, the record medium which is used with device 10 is a capstan-driven cassette having a magnetic tape which extends between supply and take-up reels. A single, bi-directional two-speed motor is provided to drive the capstan and, also, to drive supply and take-up reel spindles, respectively. A relatively simple transmission, such as a belt-drive, is used to couple the motor to the capstan and also to the supply and take-up reel spindles. Preferably, suitable clutches are provided in the spindles to permit the tape to be bi-directionally driven between the reels.

A pinch roller is mounted on a movable device, referred to herein as an actuator, in a manner similar to that described in copending application Ser. No. 434,249, now U.S. Pat. No. 4,547,821. During record and play modes of operation, the actuator is energized such that the pinch roller fully engages the capstan, thereby "pinching" the tape therebetween. The capstan is driven by energizing the motor in the forward direction, thereby transporting the tape from the supply reel to the take-up reel. A suitable record/playback head also is mounted on the actuator so as to be in good magnetic contact with the tape when the pinch roller is engaged. Consequently, information may be recorded on or played back from the tape by this head.

In the rewind and fast forward modes, the pinch roller is disengaged from the capstan by suitably energizing the actuator. This also withdraws the magnetic head from good contact with the tape. When the motor then is energized in the fast reverse direction, the tape is rewound from the take-up reel to the supply reel. Conversely, when the motor is energized in the fast forward direction, the tape is rapidly advanced from the supply reel to the take-up reel. Preferably, although the head is withdrawn from the tape, it still remains in sufficiently close contact so as to reproduce unintelligible sounds, simulating "monkey chatter" when the tape is driven. This apprises the operator of the rewind or fast forward modes of operation. For purposes of the present description, the position of the actuator during the rewind and fast forward modes is referred to as the "partially engaged" position, whereby the pinch roller is separated from the capstan and the head is "partially engaged" with the tape. In this partial engagement, the tape is free to be rapidly transported past the capstan; yet the head is sufficiently close to the tape so as to pick up the aforementioned unintelligible sounds but distinguish "pauses" between the audio segments. Finally, when device 10 is disposed in the inactive, or stop mode, the actuator is energized so as to disengage fully both the pinch roller and the head from the capstan and tape, respectively. It is this fully disengaged position that is assumed when device 10 is changed over to the aforementioned dormant condition.

The Overall Program

Figure 2:
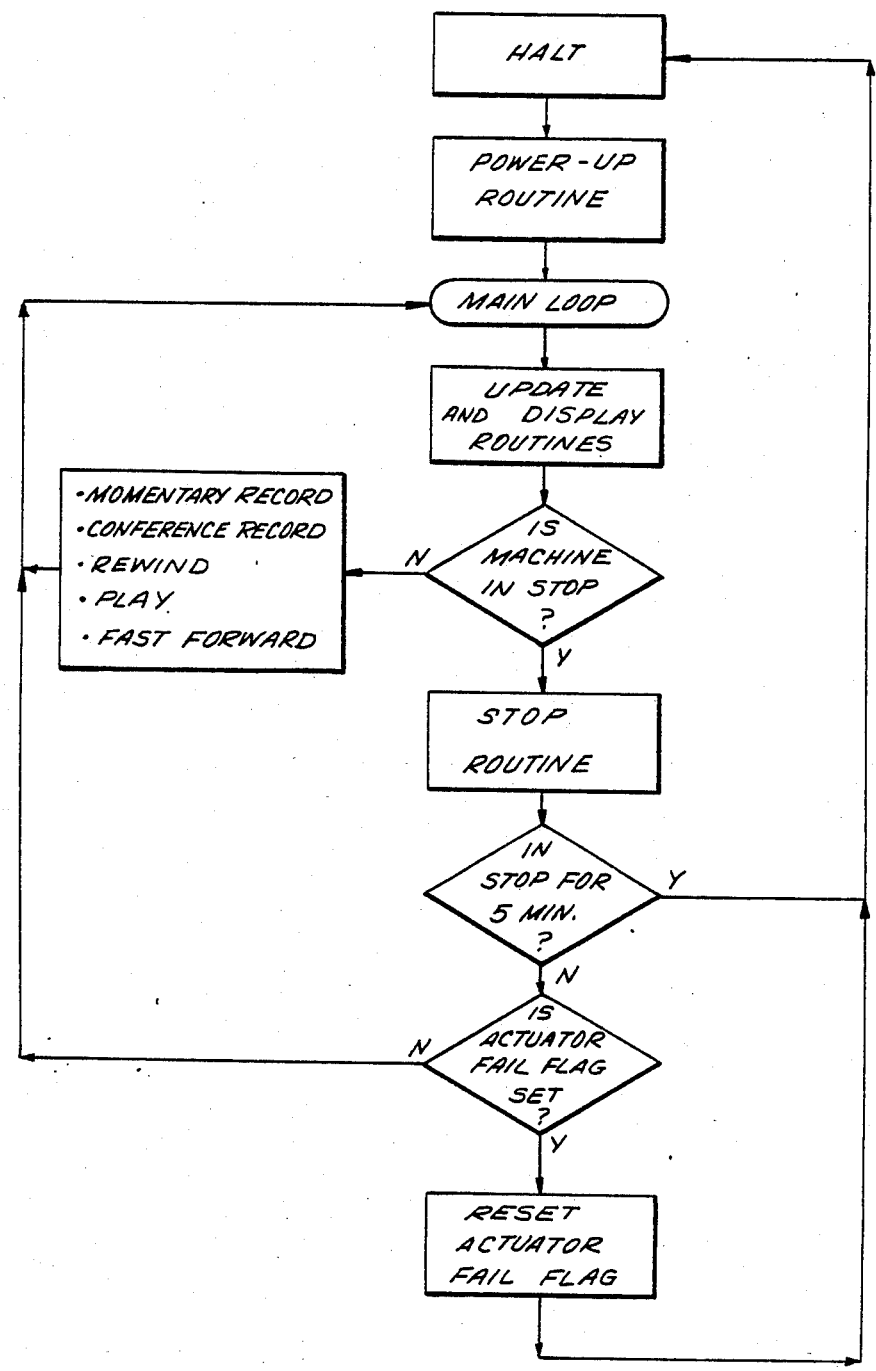
FIGS. 2–8 are flow charts corresponding to the programmed set of instructions that are used by processor apparatus in accordance with the present invention to control the operation and displays of the record/playback device shown in FIG. 1.

Referring now to FIG. 2, there is illustrated a flow chart of the overall program for the microprocessor included in recorder 10. It will be appreciated that the term microprocessor is intended to refer to a digital central processor which operates in accordance with a cyclical programmed set of instructions and, in conjunction with various peripheral devices comprises a microcomputer. In accordance with the present invention, the central processor may include a conventional microprocessor, such as a National Semiconductor Model COPS 444C, a Hitachi Model 44790, or the like. The overall program described herein is represented in the form of flow charts which may be implemented by any of the foregoing microprocessors.

The overall program includes, broadly, a power-up routine that is carried out when device 10 is brought out of its dormant condition, as when enable button 36 (FIG. 1) is operated, and a main loop which is executed when the device is changed over from its dormant routine. The main loop includes various update and display routines, the relevant ones of which are described in greater detail below. Included in the update routines are a tone and timer update routine and a tape counter update routine, as described in copending application Ser. No. 564,191. When carrying out the tone and timer update routine, various timers are incremented in response to the clock circuit of the microprocessor.

The tone and timer update routine functions to control the generation of warning tone signals upon the occurrence of certain predetermined events. For example, when certain cue signals are generated, a tone routine initiates the generation of a corresponding warning tone such that the user of device 10 is apprised of the generation of the cue signal. Also, when the magnetic tape with which device 10 is used is advanced to an end zone region thereof, an appropriate warning tone is generated to apprise the user that only a relatively small quantity of tape remains available for further recording. In addition, when the tape has been fully advanced such that the end of tape has been reached, a suitable warning tone is generated. Still further, when device 10 is operated in a mode whereby previously recorded information is erased from the magnetic tape, suitable warning tones are generated during this erase process.

After the tone and timer update routines are carried out, the microprocessor carries out its tape counter update routine. The purpose of this routine is to update various tape counters which are used to indicate the amount of tape which has been transported and, additionally, to indicate the present position of the tape.

Thereafter, the display routine is executed for the purpose of controlling display 40 such that the appropriate numerical information is displayed by numerical display 42 and the appropriate bar graph display is displayed by segment 44. That is, depending upon the operating mode of device 10 and/or the display mode selected by the operation of reset/mode button 32, a tape count, message number or instruction number is displayed by numerical display 42; and a bar graph or "motion" indication (left-to-right or right-to-left shifting effect) is displayed by segments 44. The display routine is described in greater detail below.

After carrying out the update and display routines, the microprocessor advances to inquire whether device 10 (also referred to in these flow charts as the "machine") is disposed in its stop mode. As described in the aforementioned copending application, this inquiry is determined by sensing which, if any, of the control buttons is operated; and if it is determined that the device is not disposed in its stop mode, then the routine commanded by the operated control button is carried out prior to cycling through the main loop once again. For example, the momentary record routine is executed if record button 24 is operated; the conference record routine is carried out if conference button 22 had been operated; the rewind routine is carried out if rewind/play button 28 is operated; the play routine is carried out if the rewind/play button had been operated and then released; and the fast forward routine is carried out if fast forward button 34 is operated. If none of these control buttons is operated, or if stop button 26 is operated, the inquiry as to whether the device is disposed in its stop mode is answered in the affirmative, and the stop routine is carried out. As part of the stop routine, inquiry is made as to whether device 10 has remained in the stop mode for a predetermined time (e.g. five minutes). If so, the device promptly assumes its dormant (or "halt") condition. But, if the device has not remained in the stop mode for this predetermined time, inquiry next is made as to whether the actuator on which the pinch roller and record/playback head are supported, has failed in not returning to its fully disengaged position. If so, a suitable indication thereof is provided and the device then assumes its dormant condition. However, if the actuator has not failed, the microprocessor cycles through the main loop once again.

Main Loop

Figure 3:
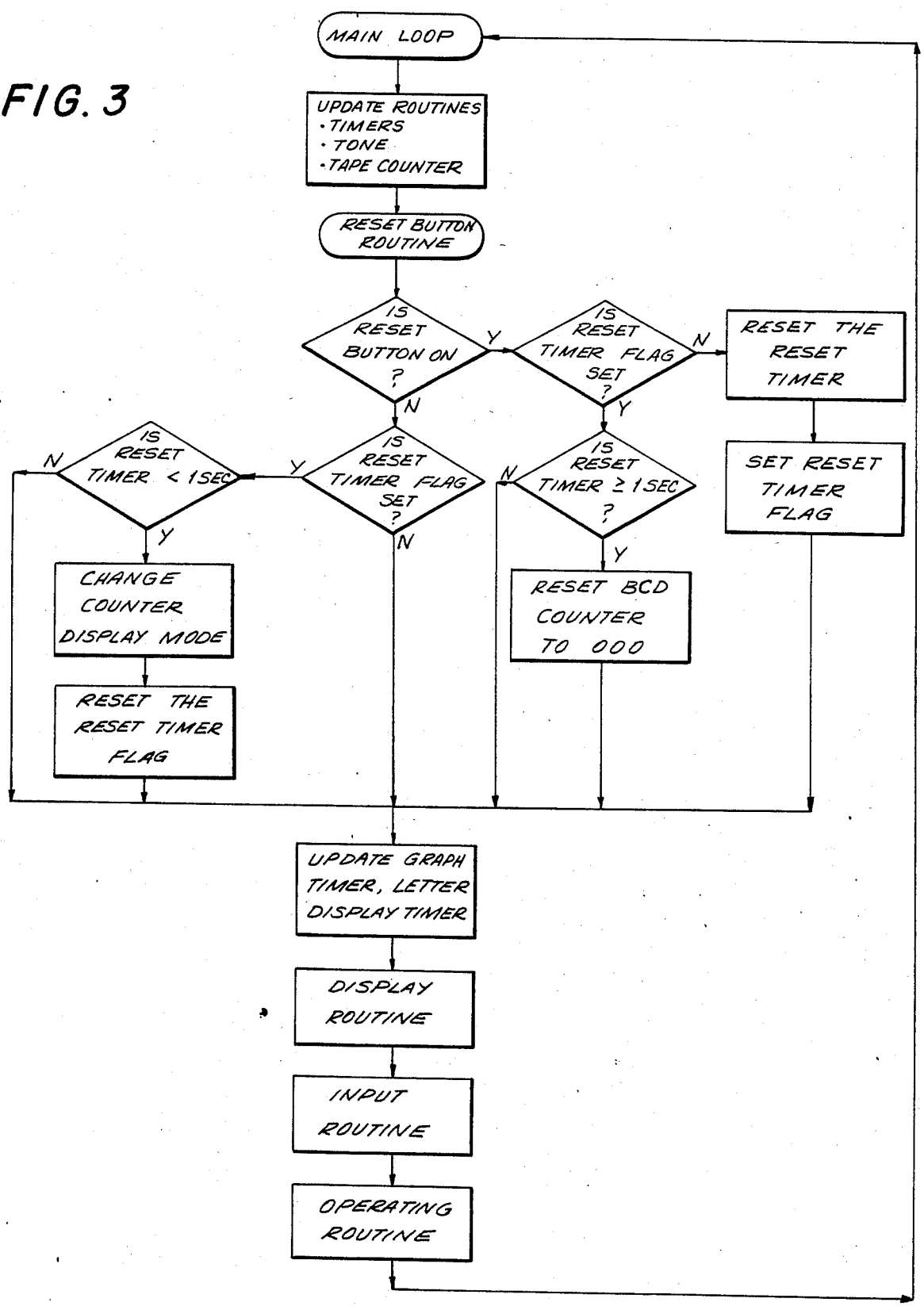

In the flow chart illustrated in FIG. 3, the main loop commences with update routines for the various timers, for tone generation and for the tape counter. The tone and timer update routine is described in the aforementioned copending application; and the tape counter update routine, to the extent that it relates to the displays of the present invention, is described with respect to the flow chart of FIG. 4. After these update routines are carried out, a reset button routine is executed. This routine detects whether reset/mode button 32 is operated and, if so, whether display 40 is in its "tape count" mode, whereby numerical display 42 displays a count representing the present position of the record medium, or whether the display is in its "cue" mode, whereby the numerical display displays the number of the particular letter now juxtaposed the record/playback head or the number of the particular instruction to which the record medium has been rewound or advanced.

More particularly, the reset button routine operates to detect whether reset/mode button 32 is operated for more than a predetermined amount of time. If it is, numerical display 42 is reset or cleared, and the tape counter associated therewith is reset. However, if the reset/mode button is operated momentarily, i.e. for less than the aforementioned predetermined time, the display mode merely is changed over from its present mode to the other. In carrying out the reset button routine, inquiry first is made as to whether reset/mode button 32 is being operated. If it is, inquiry next is made of whether a reset timer flag is set. Normally, this flag is not set and this inquiry is answered in the negative. Accordingly, the reset timer, which is incremented in the tone and timer update routine (not shown), is reset and the reset timer flag then is set. Thereafter, the main loop exits from the reset button routine to carry out the graph timer and letter display timer update routine.

If the reset button is being operated and the reset timer flag is set, for example, if this is the second cycle through the reset button routine after the reset button has been operated, inquiry next is made as to whether the reset timer has been incremented to a count equal to or greater than approximately one second. This inquiry senses whether the reset button has remained operated for at least one second. If this inquiry is answered in the negative, that is, if one second has not yet passed since the reset button first was operated, the reset button routine merely exits to the graph timer and letter display timer update routine. However, if the reset timer has timed out, that is, if the count of the reset timer has been incremented (during successive cycles through the tone and timer update routine) to a count that is equal to or greater than one second, the tape counter (as an example, a BCD counter) is reset to a predetermined count of, for example, [000]. The reset button routine then exits to the graph timer and letter display timer update routine.

If the reset button had been operated and then released, the inquiry of whether the reset button is on is answered in the negative, and the next-following inquiry of whether the reset timer flag is set will be answered in the affirmative. It is recalled that this flag was set upon sensing the operation of the reset button. Then, inquiry is made as to whether the count of the reset timer is less than one second. If it is, thus indicating that the reset button was operated momentarily, the display mode of numerical display 42 is changed over from one mode to the other, and then the reset timer flag is reset. For example, if display 40 had been in its "tape count" mode, the display mode now is changed over to the "cue" mode. Conversely, if display 40 had been disposed in its "cue" mode, it now is changed over to its "tape count" mode. However, if the inquiry of whether the reset timer is less than one second is answered in the negative, thus indicating that the reset button had been operated for a prolonged period of time, the reset button routine merely exits to the graph timer and letter display timer update routine.

From FIG. 3, it also is seen that if the reset button is not on and if the reset timer flag has not been set, the reset button routine merely exits to the graph timer and letter display timer update routine. This latter routine increments separate timers, referred to herein as a graph timer and a letter display timer. The purpose of the graph timer is to establish a predetermined time interval during which an individual bar graph display segment 44 is energized, this interval being relatively brief so as to provide left-to-right and right-to-left shifting effects when device 10 is disposed in its fast-forward or rewind mode, respectively. As will be described below in connection with the alphanumeric and tape direction routine, the graph timer is reset every quarter of a second if the device is in its fast-forward or rewind mode.

The letter display timer is adapted to establish a predetermined display interrupt interval during which the "tape count" mode of display 40 is interrupted to display the number of the letter which has just been recorded. The manner in which the letter display timer is used to interrupt the "tape count" mode is described in greater detail below with respect to the alphanumeric and tape direction routine.

After executing the graph timer and letter display timer update routine, the main loop proceeds to the display routine. This routine is comprised of a display bar graph routine, described below with respect to the flow chart shown in FIG. 5, and the aforementioned alphanumeric and tape direction routine, described with respect to the flow charts shown in FIGS. 6A–6D. These routines control the selective energization of the segments comprising bar graph display 44 and the selective energization of numerical display 42. In addition, and as will be described, the alphanumeric and tape direction routine selectively controls the energization of the LTR and INS symbols. Furthermore, depending upon the operating mode of device 10, the PLAY and REC symbols are selectively energized by the display routine.

After the display routine is carried out, an input routine is executed. The input routine is described in greater detail in the aforementioned copending application. In this routine, the operation of a control button is sensed; and various flags are set or reset for use in establishing the commanded mode of operation of device 10. Hence, the input routine may be thought of as preconditioning the microprocessor for the subsequent execution of a suitable active (or inactive) routine.

After carrying out the input routine, the microprocessor advances to carry out the operating routine by which the commanded operation of the device is effected. Thus, depending upon which, if any, of the control buttons is operated, a corresponding operating mode is established. These operating modes are described in the aforementioned copending application; and to the extent that the recording mode and the rewind mode (as examples) relate to the displays of the present invention, a portion of the record routine is described below in conjunction with the flow charts shown in FIGS. 7A and 7B, and a portion of the rewind routine is described below in conjunction with the flow chart shown in FIG. 8.

Tape Counter Update Routine

Figure 4A:
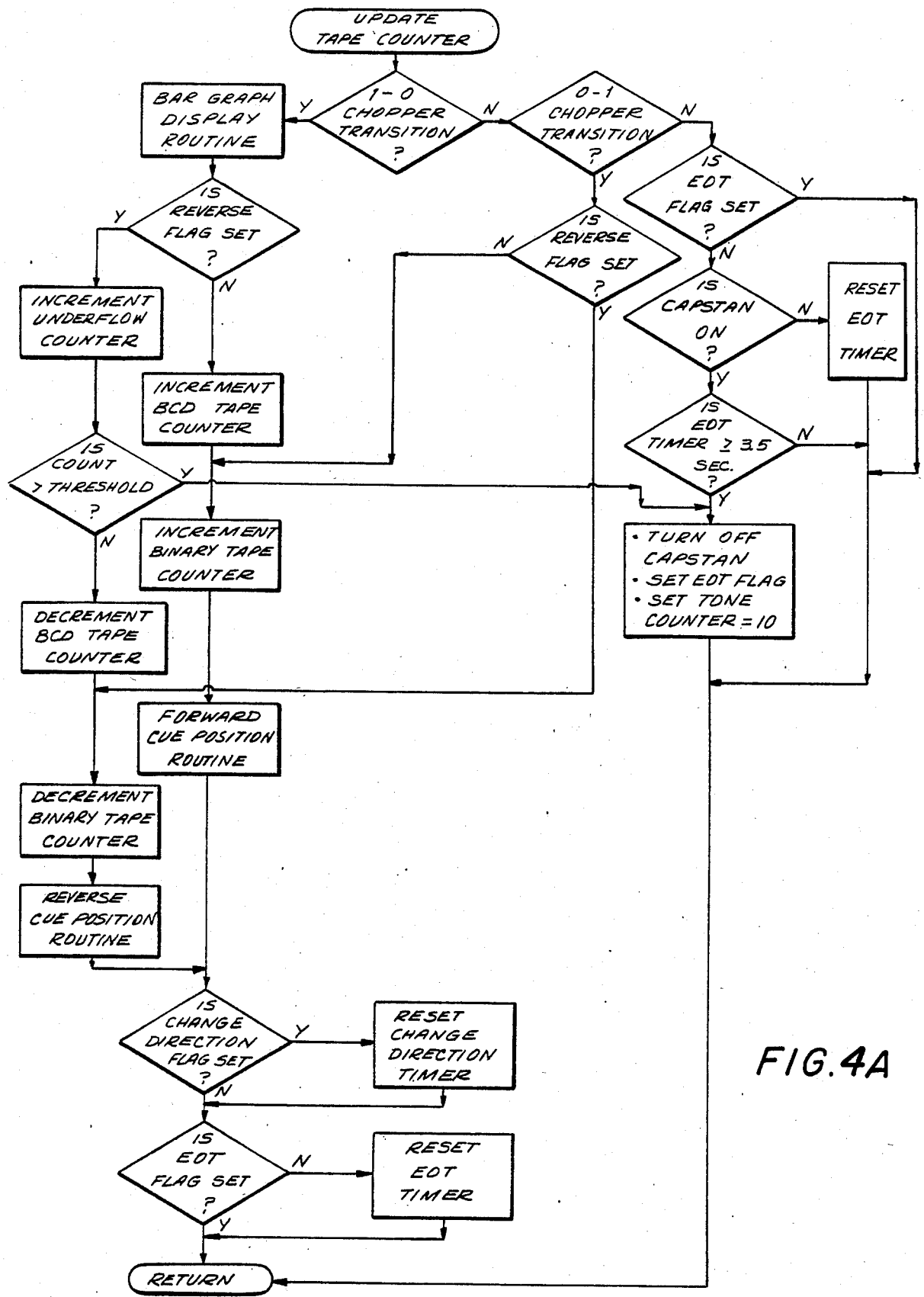

The tape counter update routine, diagrammatically represented by the flow chart shown in FIG. 4A, is adapted to sense when tape is moved, the direction in which movement is effected, and the amount of tape which has been transported. Preferably, a so-called chopper wheel is mechanically coupled to the supply reel drive spindle so as to generate pulses at a rate corresponding to the rotary speed of the supply reel. Chopper wheels of various constructions are known to produce voltage transitions as the reel rotates. For convenience, a voltage transition from a relatively higher voltage level to a lower level is referred to herein as a transition from a binary "1" level to a binary "0" level (a 1/0 transition), and a voltage transition from a relatively lower voltage level to a relatively higher level is referred to as a binary "0" to binary "1" transition (a 0/1 transition).

Preferably, the chopper wheel is mechanically coupled to the supply reel drive spindle. Hence, as tape continues to be wound upon the take-up reel, the supply reel rotates at a faster speed because of reduced tape diameter. Consequently, the chopper pulses likewise exhibit a higher repetition rate. Alternatively, if the chopper wheel is mechanically coupled to the take-up reel drive spindle, the repetition rate of the chopper pulses decreases as more tape is wound upon the take-up reel. The tape counter update routine increments or decrements a tape counter, thus generating information as to the relative location of the tape along its length.

As shown in FIG. 4A, the tape counter update routine commences by sensing whether a 1/0 chopper pulse transition is present. If not, inquiry is made as to whether a 0/1 transition is present. In the absence of a chopper pulse transition, inquiry is made as to whether an end-of-tape (EOT) flag is set. If it is, the microprocessor merely returns to the main loop to continue with that portion of the main loop routine which follows the update routines. However, if the EOT flag is not set, inquiry is made as to whether the capstan motor is operating. If not, the EOT timer, which is incremented during the tone and timer update routine, is reset; and the microprocessor then returns to the main loop. But, if the capstan motor is on, inquiry is made as to whether the count of the EOT timer is equal to or greater than 3.5 seconds. If the count of the EOT timer is less than this quantity, the microprocessor returns to the main loop. But, if the count of the EOT timer is equal to or greater than 3.5 seconds, the capstan motor is turned off, the EOT flag is set and a tone counter is set to a predetermined count, for example, a count of ten, to initiate an end-of-tape audible warning. Then, the microprocessor returns to the main loop. It will be seen that the end of tape (EOT) is sensed when no chopper pulse transitions are produced while the capstan is operating and the count of the EOT timer is incremented to a count equivalent to 3.5 seconds. It will further be seen that the EOT timer is permitted to be incremented during active modes, that is, when the capstan motor is energized to drive the tape. However, when the capstan motor is turned off, the EOT timer is reset during each cycle through the tape counter update routine.

Let it be assumed that a 1/0 chopper pulse transition is sensed. A bar graph display routine, shown in conjunction with the flow chart of FIG. 5, first is carried out to update index display 44 (FIG. 1), and then inquiry is made as to whether a reverse flag is set. Alternatively, the bar graph display routine may be executed at a later time, as shown in the main loop routine of FIG. 3. As described in aforementioned copending application Ser. No. 564,191 the reverse flag is set when, for example, rewind/play button 28 is operated to rewind the tape. If this flag is not set, the BCD tape counter (referred to in the reset button routine) is incremented. Then, a binary tape counter is incremented. Although two different tape counters are employed in one embodiment of this invention, it will be appreciated that, if desired, only a single tape counter may be used and only 1/0 (or only 0/1) chopper pulse transitions need be sensed to update that tape counter.

If a 1/0 chopper pulse transition is not present but a 0/1 transition is, inquiry is made as to whether the reverse flag is set. If not, the binary tape counter is incremented. It is seen, from the flow chart shown in FIG. 4A, that the binary tape counter is incremented in response to each chopper pulse transition; but the BCD tape counter is incremented only in response to 1/0 chopper pulse transitions. The binary tape counter thus is provided with a count of higher resolution and more precision than the BCD tape counter. Nevertheless, the count provided by the BCD tape counter is sufficient to be displayed by numerical display 42 (FIG. 1) and provide an indication of the present location of the tape. Alternatively, the BCD tape counter can be omitted and the binary tape counter used to control display 42. In addition to controlling the numerical display, the count present in the tape counter, preferably the binary tape counter, is used to indicate the locations of cue signals which are recorded on the tape. This is described in greater detail below with respect to the flow charts shown in FIGS. 7A, 7B and 8.

In the event that the reverse flag is set when a 1/0 or 0/1 chopper pulse transition is sensed, the BCD and binary tape counters are decremented. In particular, if the reverse flag is set when a 1/0 transition is detected, an underflow counter first is incremented. Then, inquiry is made as to whether the count of this underflow counter is greater than a threshold value. It will be appreciated that, during a rewind operation, if the tape breaks, the supply reel drive spindle may, nevertheless, continue to be driven. To apprise the user that, in fact, the tape has broken and is not being rewound, the underflow counter is incremented in response to 1/0 chopper pulse transitions; and when the count of this underflow counter exceeds a threshold value, the capstan motor is turned off, the EOT flag is set and the tone counter is set to the count of ten, all this being similar to the operations that take place when the end of tape has been reached. Thus, the underflow counter is used to sense the possibility of tape breakage in the rewind mode. It will be appreciated that if the tape breaks when being transported in the forward direction, the supply reel no longer rotates; and this is the very same condition which obtains when the end of tape is reached. There is, therefore, no need to provide separate means by which tape breakage in the forward direction is sensed.

If the underflow counter has not been incremented beyond the threshold value, the BCD tape counter is decremented and then the binary tape counter also is decremented. From the flow chart of FIG. 4A, it is seen that if a 0/1 transition is sensed and if the reverse flag is set, then only the binary tape counter is decremented. Thus, the binary tape counter is both incremented and decremented in response to each chopper pulse transition, whereas the BCD tape counter is incremented and decremented in response only to 1/0 chopper pulse transition. If desired, only the BCD tape counter need be used, and twice the number of transitions can be provided for a single rotation of the chopper wheel.

After the binary tape counter is updated, that is, after it has been incremented or decremented, depending upon whether the reverse flag is set, a forward or reverse cue position routine is carried out. More particularly, the forward cue position routine is executed when the tape is driven in the forward direction and the reverse cue position routine is executed when the tape is driven in the reverse direction. The purpose of the forward or reverse cue position routine is to update a cue memory address which addresses a cue memory that stores, in separate addressable locations, counts of the binary tape counter that represent those locations on the magnetic tape at which letter or instruction cue signals have been recorded. In one embodiment, such counts are stored in successive locations of a "letter" section of the cue memory to represent the locations of letter cue signals (i.e. the locations of ends of letters, or messages), and other counts are stored in successive locations of an "instruction" section of the cue memory to represent the locations of instruction cue signals. The cue memory address is adapted to address the next successive location in the "letter" or "instruction" section of the cue memory to store a "letter" position count or "instruction" position count, respectively, if a letter or instruction cue signal is generated. However, if the tape is rewound past a previously recorded cue signal, the cue memory address should be decremented to make available the cue memory location that stored a "letter" or "instruction" position count because that count may be discarded. Similarly, if the tape is advanced past that previously recorded cue signal, the cue memory address should be incremented to make available the next cue memory location because the previously stored "letter" or "instruction" position count may be retained.

Figure 4B:
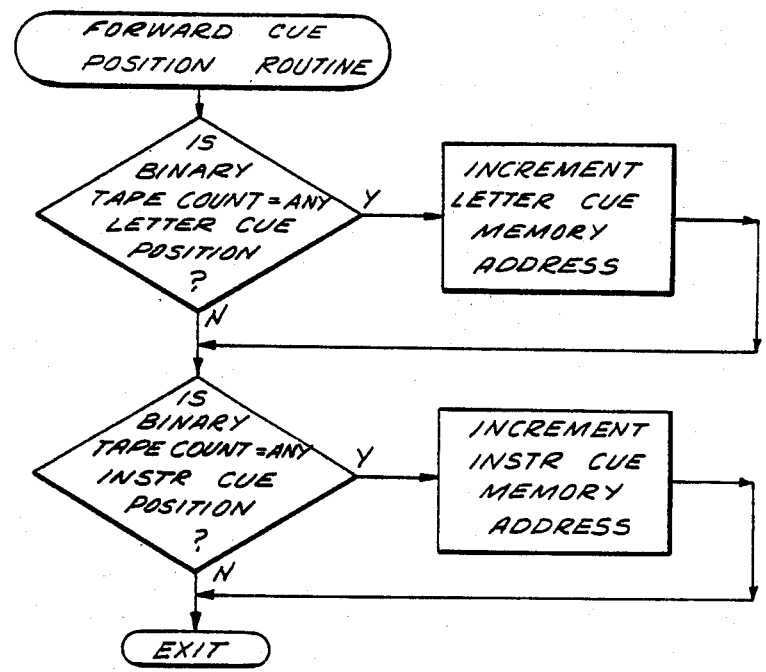

Turning to FIG. 4B, the forward cue position routine is carried out by inquiring if the present count of the binary tape counter is equal to any count stored in the "letter" section of the cue memory. This inquires if the present position of the tape is equal to a position at which the end of a letter had been recorded. If so, the letter cue memory address is incremented. Then, after the letter cue memory address is incremented or, alternatively, if the count of the binary tape counter is not equal to a stored letter cue position, inquiry is made if the count of the binary tape counter is equal to a stored count representing the location (or position) of a previously recorded instruction. If this inquiry is answered in the negative, the microprocessor exits the forward cue position routine to continue the tape counter update routine. But, if the tape is positioned at a location at which an instruction had been recorded, the instruction cue memory address is incremented, thereby addressing the next successive location of the "instruction" section of the cue memory. Then, the microprocessor exits the forward cue position routine.

Figure 4C:
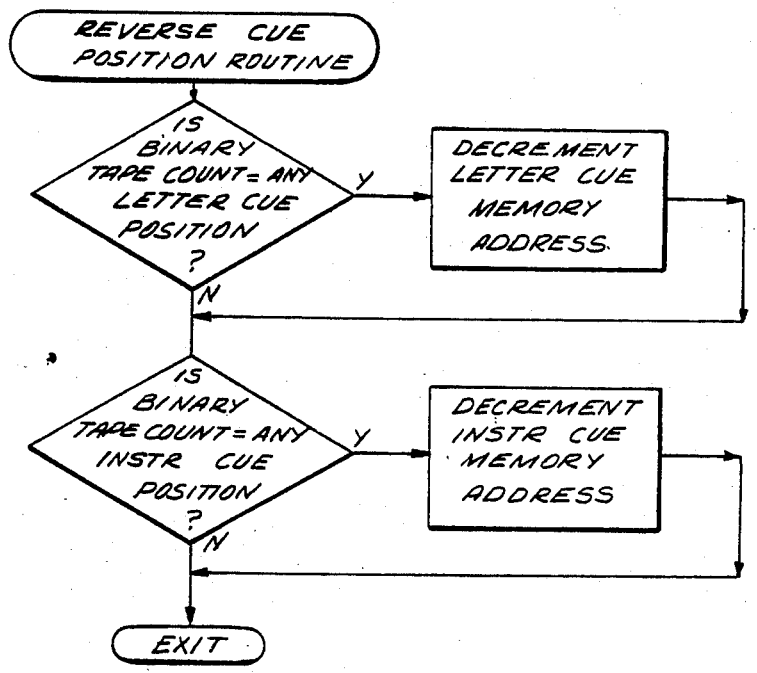

The reverse cue position routine is similar to the forward cue position routine and is represented by the flow chart of FIG. 4C. As before, inquiry first is made of whether the present count of the binary tape counter is equal to a stored count representing the location of a previously recorded end of letter. If so, the letter cue memory address is decremented. Then, or in the alternative if this inquiry is answered in the negative, inquiry next is made as to whether this count of the binary tape counter is equal to a stored count representing the location of a previously recorded instruction. If so, the instruction cue memory address is decremented and the microprocessor then exits the reverse cue position routine to continue the tape counter update routine. However, if this last inquiry is answered in the negative, the microprocessor merely exits the reverse cue position routine and continues the tape counter update routine.

Thus, it is seen that the cue memory address is incremented or decremented, depending upon the direction in which the tape is moved, when the present position of the tape coincides with the end of a previously recorded letter or with a previously recorded instruction. If the cue memory address is decremented, the previously recorded end of letter or instruction may be discarded because its stored count (representing the position at which it had been recorded) now may be "over-written" in the cue memory.

After the forward or reverse cue position routine is carried out, inquiry is made as to whether a change direction flag is set. This flag is set when the direction in which the tape is driven is reversed. Thus, if the tape had been driven in the forward direction to carry out a record or play or fast forward operation, the change direction flag will be set in response to the operation of rewind/play button 28. Alternatively, if the tape had been driven in the reverse direction, the change direction flag will be set when rewind/play button 28 is released or when conference record button 22 or momentary record button 24 or fast forward button 34 next is operated. If the inquiry as to whether the change direction flag is set is answered in the affirmative, a change direction timer (described in the aforementioned copending application) is reset. Next, or if the change direction flag is not set, inquiry is made as to whether the EOT flag is set. If so, the microprocessor returns to the main loop; and if not, the EOT timer first is reset before returning to the main loop. Thus, the EOT timer is reset in response to each chopper pulse transition.

Bar Graph Display Routine

Figure 5:
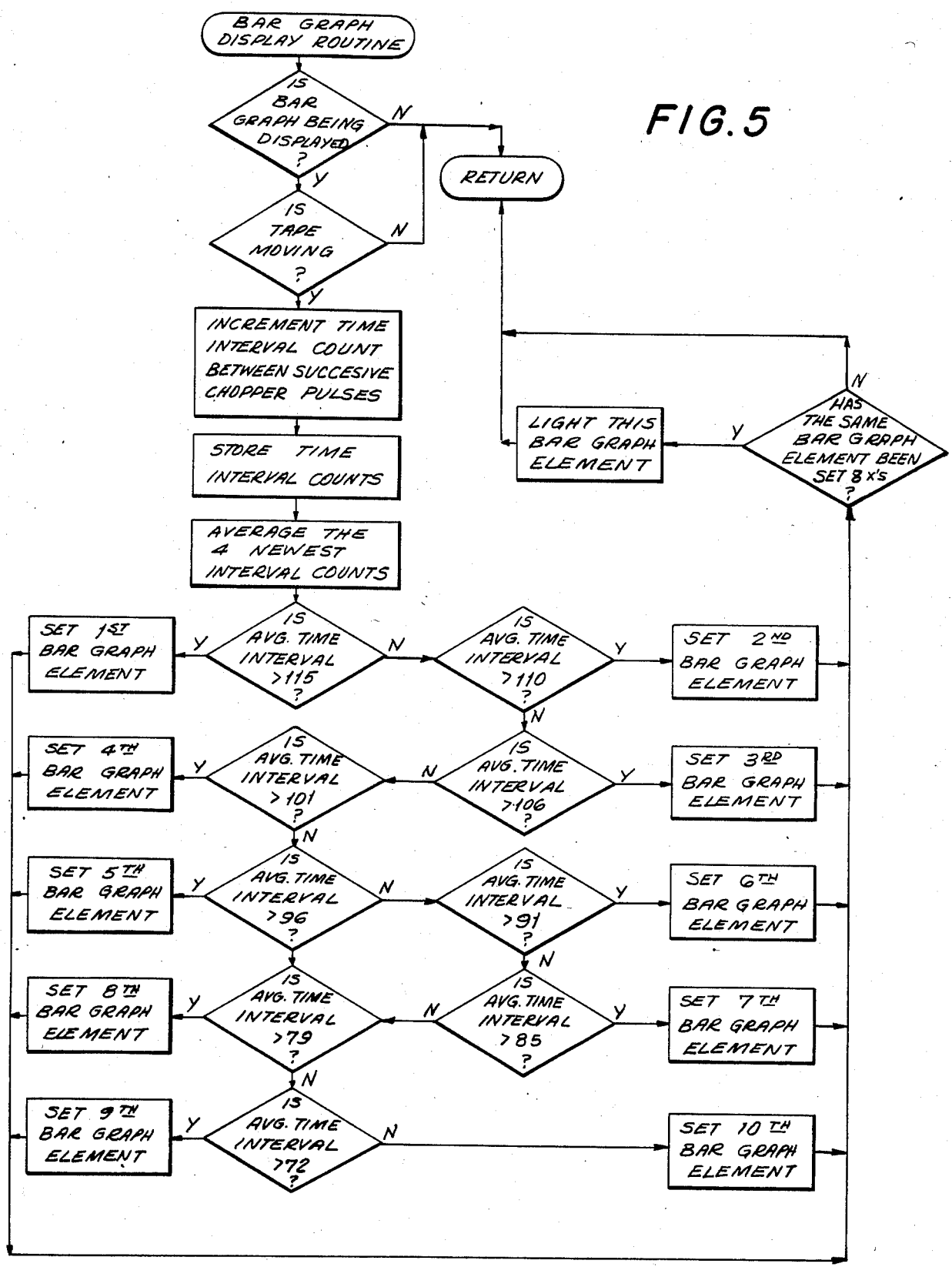

The bar graph display routine, which may be carried out following the sensing of a 1/0 chopper pulse transition in the tape counter update routine, or which may be carried out following the reset button routine and the graph timer and letter display timer update routine as shown in FIG. 3, is represented by the flow chart illustrated in FIG. 5. Initially, inquiry is made as to whether the bar graph is being displayed. This inquiry is answered in the affirmative if device 10 is disposed in its record or playback mode, or if the device has been changed over from either of these modes to its stop mode. Conversely, this inquiry is answered in the negative if device 10 is disposed in its fast forward or rewind modes. If the latter, the microprocessor exits the bar graph display routine to return to the tape counter update routine or to the main loop, depending upon where in the microprocessor program this bar graph display routine is carried out.

If the inquiry of whether the bar graph is being displayed is answered in the affirmative, inquiry next is made as to whether the tape is moving. If not, for example, if the device is disposed in its stop mode, the microprocessor returns to, for example, the main loop. However, if the bar graph is being displayed and if the tape is moving, a counter which is used to obtain a count representing the time interval between successive chopper pulse transitions is incremented. Next, this time interval count is stored; and, thereafter, the four newest, or latest, of these stored interval counts are averaged to produce an average interval count. (If desired, any suitable number of stored interval counts, e. g. six, may be averaged.) It is recalled that chopper pulses are generated as a function of the angular rotation of the supply reel. As tape is advanced, the diameter of this supply reel decreases, resulting in an increase in the angular rotation thereof and, thus, an increase in the chopper pulse frequency. That is, the interval separating successive chopper pulse transitions is reduced. Hence, depending upon the diameter of the supply reel, a simple count of the chopper pulses derived from the rotation thereof is not necessarily an accurate measure of the length of tape which has been transported. For example, if the tape is fully loaded onto the supply reel then, for uniform rotary speed thereof, one chopper pulse is generated when an incremental length of tape is transported. However, as the supply reel diameter decreases, chopper pulses are generated for progressively smaller incremental lengths of tape. Let it be assumed that the supply reel initially is fully loaded with a quantity of tape capable of recording messages for up to thirty minutes. For a quantity of tape corresponding to the first three minutes of recording, successive chopper pulses will be separated by a relatively large time interval such that the time interval counter will be incremented to a count in excess of 115 (for example) until the next succeeding chopper pulse transition is detected. That is, the average time interval count between these successive chopper pulse transitions will exceed 115. This interval will decrease when a quantity of tape approximately equal to the next 3-6 minutes is transported. More particularly, in the present example this average time interval count is within the range of 115-110 after 3-6 minutes of tape have been transported. Thereafter, the average time interval count is reduced to the range of 110-106, when 6-9 minutes of tape have been transported. The following table represents an example of the average time interval counts separating chopper pulse transitions as different amounts of tape have been transported:

TABLE I

| Amount of transported tape (in terms of time) | Average time interval counts: | | Bar graph element to be energized |
|---|---|---|---|
| | greater than | less than | |
| 0-3 minutes | 115 | — | 1 |
| 3-6 minutes | 110 | 115 | 2 |
| 6-9 minutes | 106 | 110 | 3 |
| 9-12 minutes | 101 | 106 | 4 |
| 12-15 minutes | 96 | 101 | 5 |
| 15-18 minutes | 91 | 96 | 6 |
| 18-21 minutes | 85 | 91 | 7 |
| 21-24 minutes | 79 | 85 | 8 |
| 24-27 minutes | 72 | 79 | 9 |
| 27-30 minutes | — | 72 | 10 |

It will be appreciated that the average time interval counts set out hereinabove represent the average number of times that the time interval counter is incremented as the bar graph display routine is carried out. As a numerical example, the bar graph display routine is executed once every 16 milliseconds. Hence, the time interval count between successive chopper pulse transitions is incremented once every 16 milliseconds and, upon the occurrence of the next successive chopper pulse transition, the time interval counter is reset. It is seen that, as the amount of tape which has been transported from the supply reel to the take-up reel increases, the average time interval count between successive chopper pulse transitions decreases. Consequently, depending upon the average interval count, the present position of the tape with respect to its overall length may be determined.

Returning to the flow chart of FIG. 5, after the four latest or newest time interval counts have been averaged (as an example), inquiry is made as to whether the average time interval count is greater than 115. If so, the first or left-most, of the segments comprising bar graph display 42, that is, the first bar graph element, is set. It will be appreciated, from the flow charts shown in FIGS. 6B-6C, that the setting of a bar graph element conditions that element to be energized; and in the embodiment described herein, the conditioned element is not actually turned on, or energized, until the alphanumeric and tape direction routine is carried out.

If the average time interval count between successive chopper pulse transitions is not greater than 115 but is greater than 110, the second bar graph element is set. If the average time interval count between successive chopper pulse transitions is within the range of being greater than 106 but not greater than 110, the third bar graph element is set. If the average time interval count is within the range of greater than 101 but not greater than 106, the fourth bar graph element is set. If the average time interval count is within the range of greater than 96 but not greater than 101, the fifth bar graph element is set. If the average time interval count is within the range of greater than 91 but not greater than 96, the sixth bar graph element is set. If the average time interval count is within the range of greater than 85 but not greater than 91, the seventh bar graph element is set. If the average time interval count is within the range of greater than 79 but not greater than 85, the eighth bar graph element is set. If the average time interval count is within the range of greater than 72 but not greater than 79, the ninth bar graph element is set. If the average time interval count is not greater than 72, the tenth bar graph element is set.

After setting the appropriate bar graph element, as illustrated in FIG. 5, inquiry is made as to whether the same bar graph element has been set eight successive times. If not, the microprocessor exits the bar graph display routine. However, if this inquiry is answered in the affirmative, the bar graph element which has been so set is conditioned to be energized. Then, the microprocessor exits the bar graph display routine.

In the foregoing description of the bar graph display routine, it is seen that, during each cycle therethrough, the time interval count between successive chopper pulse transitions is incremented and, once a time interval count is obtained, it is stored. An average time interval count is obtained by averaging the four latest time interval counts on a so-called "rotating" basis. Then depending upon the average time interval count, the appropriate bar graph element is set. It is appreciated, therefore, that the bar graph display is conditioned to display, in bar graph form, the present position of the tape. That is, by determining the separation between successive chopper pulse transitions, an approximation of the amount of tape which has been transported from the supply reel to the take-up reel can be indicated. It will be appreciated that this indication can be provided even if a new cassette having an arbitrary amount of tape already wound upon the take-up reel is loaded into device 10. From the numerical examples discussed above, it is seen that this indication can be provided after 12 successive chopper pulses have been generated.

Moreover, it is appreciated that the appropriate bar graph element is conditioned for energization when device 10 is disposed in its record or playback mode, or when the operating mode of the device has been changed over to its stop mode from the record or playback mode.

Alphanumeric and Tape Direction Routine

In one embodiment of the present invention, the alphanumeric and tape direction routine by which numerical display 42 is controlled is carried out following the bar graph display routine. In another embodiment, the bar graph display routine is carried out during the tape counter update routine and then, at a later time in the main loop (FIG. 3) the alphanumeric and tape direction routine is executed. In either embodiment, the alphanumeric and tape direction routine is of the type represented by the flow charts shown in FIGS. 6A–6D.

In this routine, inquiry first is made as to whether the energy level of the battery that is used with device 10 is below a threshold level. If this battery check inquiry results in an affirmative answer, the respective components of display 40 all are flashed. The microprocessor then returns to the beginning of the main loop. An alternative indication of a low battery level may be provided, as by energizing a suitable low-level indicator, by flashing selected sections of display 40, or the like.

However, if the inquiry of whether the energy level of the battery is below a threshold level is answered in the negative, inquiry next is made as to to whether the capstan is being driven in reverse. If this inquiry is answered in the affirmative, inquiry next is made as to whether the count of the graph timer is equal to greater than approximately 0.25 seconds. It is recalled from FIG. 3 that this graph timer is updated or incremented, after the reset button routine is carried out. If this inquiry is answered in the affirmative, as when the reverse operation of the capstan is initiated, the graph timer is reset and the particular bar graph element which is set is decremented. That is, if the tenth bar graph element had been set, it is reset and the ninth bar graph element is set. Conversely, if the ninth bar element had been set, it is reset and the eighth bar graph element is set. A similar bar graph decrement operation is carried out irrespective of the particular bar graph element which is set; and if the first bar graph element had been set, it is reset and the tenth element now is set. Then, a graph flag is reset. This graph flag, when set, enables steady-state energization of the bar graph display, as during record or playback modes of operation of device 10, and when reset permits a shifting effect of the bar graph display, as during the fast forward or rewind modes of operation of the device. This graph flag is reset if the inquiry of whether the count of the graph timer is equal to a greater than 0.25 seconds is answered in the negative.

If the capstan is not operating in reverse, inquiry is made as to whether the capstan is operating in its fast forward mode. If this inquiry is answered in the affirmative, inquiry next is made as to whether the count of the graph timer is equal to a greater than 0.25 seconds. If it is, the graph timer is reset and bar graph display 42 is incremented. That is, the particular bar graph element which is presently energized is de-energized, and the next-successive element is energized. Thereafter, or in the event that the count of the graph timer is not equal to a greater than 0.25 seconds, the graph flag is reset.

It will be appreciated that, when the tape is transported rapidly in a reverse direction, successive bar graph elements are energized individually in a right-to-left manner so as to display a shifting effect indicating that the tape is being rewound. Each element is individually energized for approximately 0.25 seconds, and then the next preceding element is energized for a similar duration. Conversely, when the tape is transported rapidly in the forward direction, successive bar graph elements are individually energized for approximately 0.25 second durations, thereby providing a left-to-right shifting effect. The user thus is apprised of the direction in which the tape is transported rapidly.

If the capstan is not driven in its reverse or fast forward modes, inquiry next is made as to whether the graph flag is set. If this inquiry is answered in the negative, as when device 10 is disposed in its stop mode and previously had been disposed in its fast-forward or reverse mode, the bar graph display is cleared. Then, inquiry is made as to whether the capstan now is set for a record or playback operation. From the foregoing conditions, it will be appreciated that this inquiry will be answered in the negative unless the operating mode of the device has just been changed over from its stop mode to its record or playback mode. The manner in which this is achieved is described in the aforementioned copending application. If this inquiry is answered in the affirmative, the graph flag is set.

When the graph flag is set, inquiry next is made as to whether the device is in its record mode. This same inquiry also is made if the graph flag has been reset. If the device is disposed in its record mode, inquiry is made as to whether the instruction cue flag is set. From the aforementioned copending application Ser. No. 564,191, it will be appreciated that the instruction cue flag is set when an instruction cue signal is recorded. Accordingly, if this inquiry is answered in the affirmative, the symbol INS is set, the symbol LTR is reset, numerical display 42 is conditioned to display the number of the instruction which has just been recorded on the tape, the display letter flag is reset and the letter timer flag also is reset. Thereafter, the flow chart proceeds to point B in FIG. 6B.

As described below in conjunction with the flow charts shown in FIGS. 7A and 7B, a memory, referred to as the cue memory, is provided in which counts of the binary tape counter are stored at successive, addressable storage locations upon the recording of an instruction cue signal. Normally, the cue memory address is incremented in sequence and, thus the cue memory address, and more particularly, the instruction cue memory address, is incremented to represent the number of the particular instruction which is recorded. Hence, the number of the instruction which has been recorded may be displayed merely by displaying a number corresponding to or derived from the present instruction cue memory address.

If device 10 is disposed in its record mode, but the instruction cue flag is not set inquiry is made as to whether the letter cue flag is set. As described in the aforementioned copending application, this flag is set upon the recording of a letter cue signal. That is, when the dictator completes his recording of a letter, the letter cue flag is set to indicate the end of that letter. If this flag is set, the display letter flag is set and the illustrated routine advances to inquire next if the "cue" display mode has been selected.

If the letter cue flag is not set, inquiry is made as to whether the display letter flag is set. If not, the illustrated routine advances to inquire if the "cue" display mode has been selected. However, if the letter cue flag is not set but the display letter flag is, the flow chart of FIG. 6A advances to inquire if the letter timer flag is set.

Assuming that device 10 is not disposed in its record mode, for example, if the device is disposed in its playback mode, inquiry is made as to whether the display letter flag is set. If this inquiry is answered in the negative, inquiry next is made as to whether the "cue" display mode has been selected. However, if the display letter flag is set, inquiry next is made as to whether the letter timer flag is set. If this latter inquiry is answered in the negative, the letter timer flag is set and the letter display timer is reset. Then, the symbol LTR is set and the symbol INS is reset. Next, numerical display 42 is conditioned to display the number of the letter which has just been recorded or, alternatively, the number of the letter which is in the process of being played back. The aforementioned cue memory preferably includes a "letter" section comprised of addressable storage locations for storing those binary tape counts which are present at the time that the end of a letter is recorded. Normally, a letter cue address generator is incremented sequentially to address successive locations in the "letter" section of the cue memory for storing the aforementioned binary tape counts. This letter cue memory address generator also is incremented and decremented as the tape is advanced and reversed respectively. Hence, the number of the letter which has just been recorded or which is in position for playback may be displayed merely by displaying a number corresponding to or derived from the address presently generated by the letter cue memory address generator. Thereafter, the routine advances to point B of FIG. 6B.

Let it be assumed that both the display letter flag and the letter timer flag are set. This condition may occur if device 10 is disposed in the stop mode after the end of a letter is recorded. The inquiry then is made as to whether the count of the letter display timer is greater than one second. If it is not, display 40 remains conditioned to display the symbol LTR and to display the number of the letter which has just been recorded. However, once the letter display timer times out, that is, once it reaches a count greater than one second, both the display letter flag and the letter timer flag are reset. It will be seen that, when the display letter flag is reset, subsequent cycles through the alphanumeric and tape direction routine will cause the display of symbol LTR to be cleared and will change over the display of numerical display 42 from the number of the letter which has been recorded to a display of the tape count. After the display letter flag and letter timer flag have been reset, the illustrated routine advances to inquire if the "cue" display mode has been selected.

In the embodiment described herein, the "cue" display mode is selected when device 10 is disposed in its fast forward or rewind modes and the location of a recorded instruction is reached. The aforementioned copending application describes the manner in which the microprocessor operates in the fast forward and rewind modes. Alternatively, the "cue" display mode may be established by the momentary operation of reset/mode button 32, whereby the "tape count" display mode is changed over to the "cue" display mode. A suitable flag may be set and reset to indicate the corresponding display mode in which display 40 is conditioned. In any event, if the "cue" display mode is not selected, the symbols LTR and INS are cleared, and numerical display 42 now is conditioned to display the count of the tape counter.

However, if the "cue" display mode has been selected, inquiry next is made as to whether the display instruction cue position count flag has been set. This inquiry is answered in the affirmative if device 10 is disposed in its fast forward or rewind mode and a previously recorded instruction has been reached or accessed, that is, this inquiry is answered in the affirmative when the count of the binary tape counter is equal to a position count stored in the "instruction" section of the cue memory. When the display instruction cue position count flag is set, the symbol INS is set, the symbol LTR is reset and numerical display 42 is conditioned to display the number of the instruction which has been reached. That is, numerical display 42 is conditioned to display a number corresponding to or derived from the address presently generated by the instruction cue address generator. Then, inquiry is made as to whether the count of the pause timer (described in the aforementioned copending application) has reached a count equal to or greater than one second. If it has, the display instruction cue position count flag is reset and the routine advances to point B of FIG. 6B. However, if the pause timer has not timed out, the display instruction cue position count flag is not reset.

If the inquiry of whether the display instruction cue position counter flag is set is answered in the negative, but the "cue" display mode has been selected, the symbol LTR is set, the symbol INS is reset and numerical display 42 is conditioned to display the number of the letter or message, which now is in position for playback. That is, a number corresponding to, or derived from, the address presently generated by the letter cue address generator is displayed. Then, the alphanumeric and tape direction routine advances to point B of FIG. 6B.

Figure 6A:
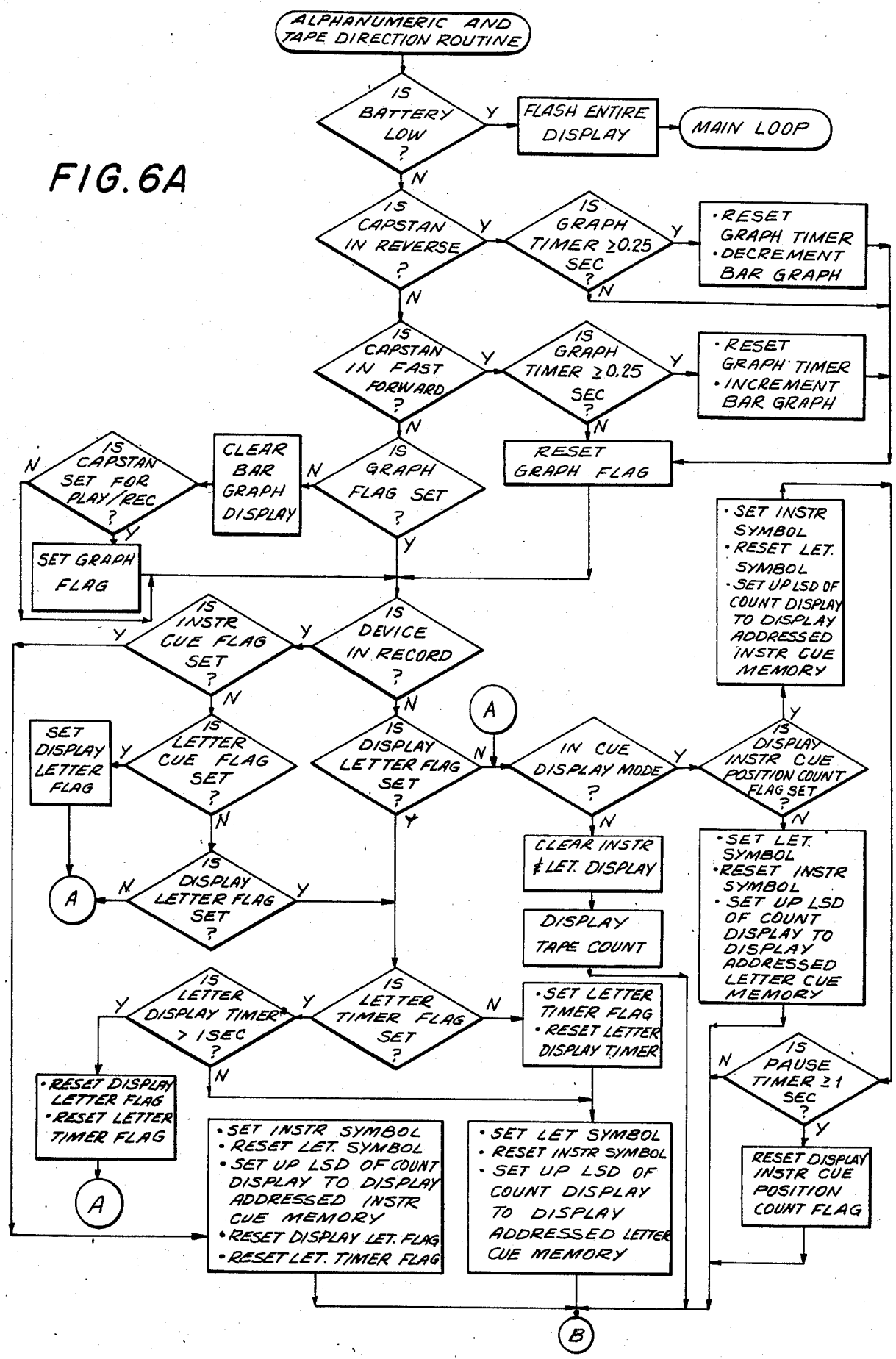
Figure 6B:
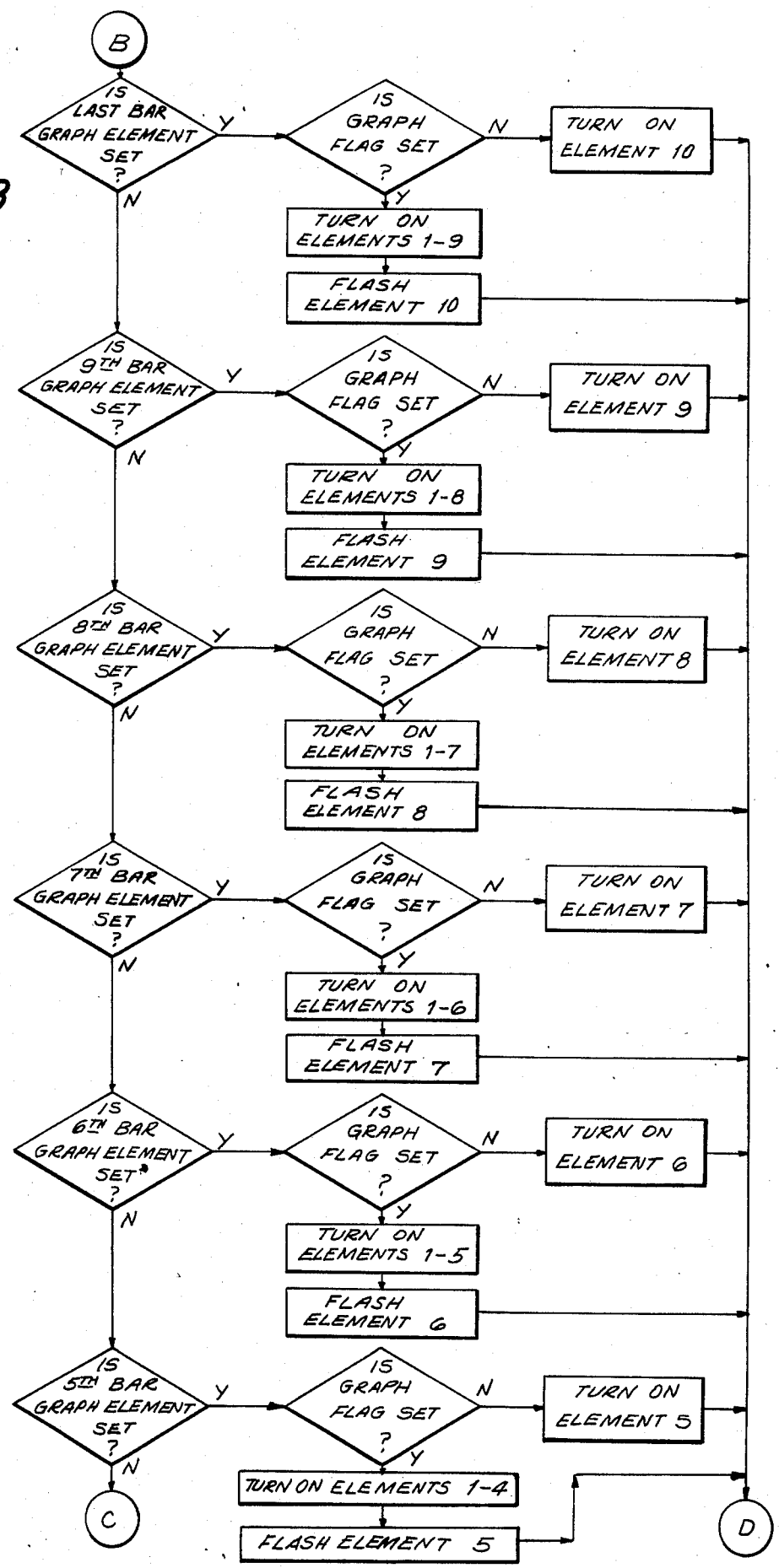

Turning to the flow chart illustrated in FIG. 6B, inquiry first is made as to whether the last or tenth bar graph element of the bar graph display 44 is set. It is recalled, from the discussion associated with the flow chart of FIG. 5, that, during the record or playback mode, a particular bar graph element is set as a function of the separation between successive chopper pulse transitions to indicate the approximate position of the tape as it is transported from the supply reel to the take-up reel. Furthermore, and was described in conjunction with the beginning portion of the flow chart shown in FIG. 6A, a particular bar graph element is set to provide a shifting effect display when device 10 is disposed in its fast forward or rewind mode. The present inquiry is intended to determine whether the particular bar graph element which may be set is the last, or tenth bar graph element. If it is, inquiry next is made as to whether the graph flag is set. As mentioned above, the graph flag is set when device 10 is disposed in its record or playback mode in order to provide a steady-state bar graph display representing the present position of the tape, and this flag is reset when the device is disposed in its fast forward or reverse mode of operation to display a shifting effect representing forward or reverse movement of the tape.

Figure 6C:
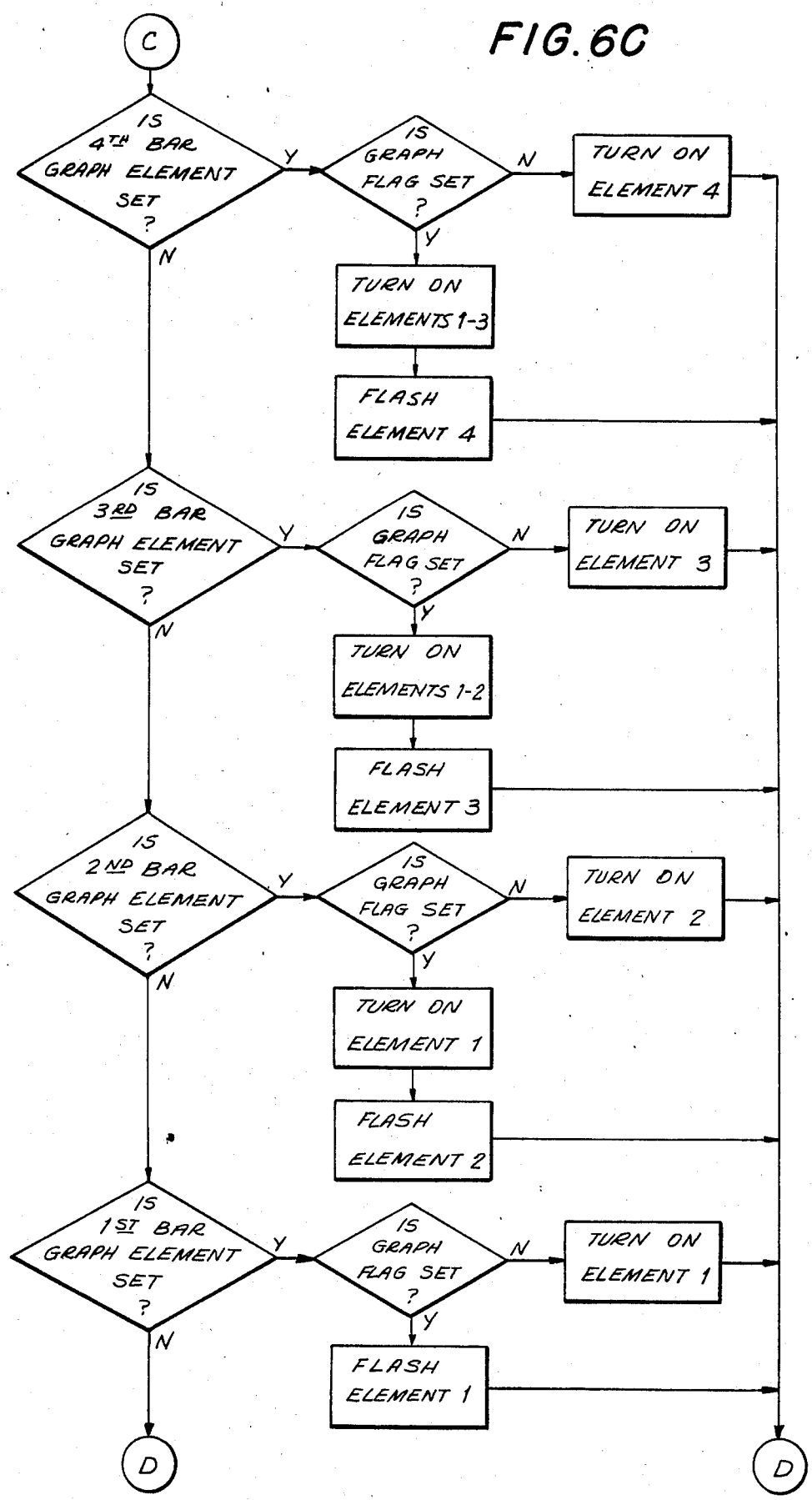
Figure 6D:
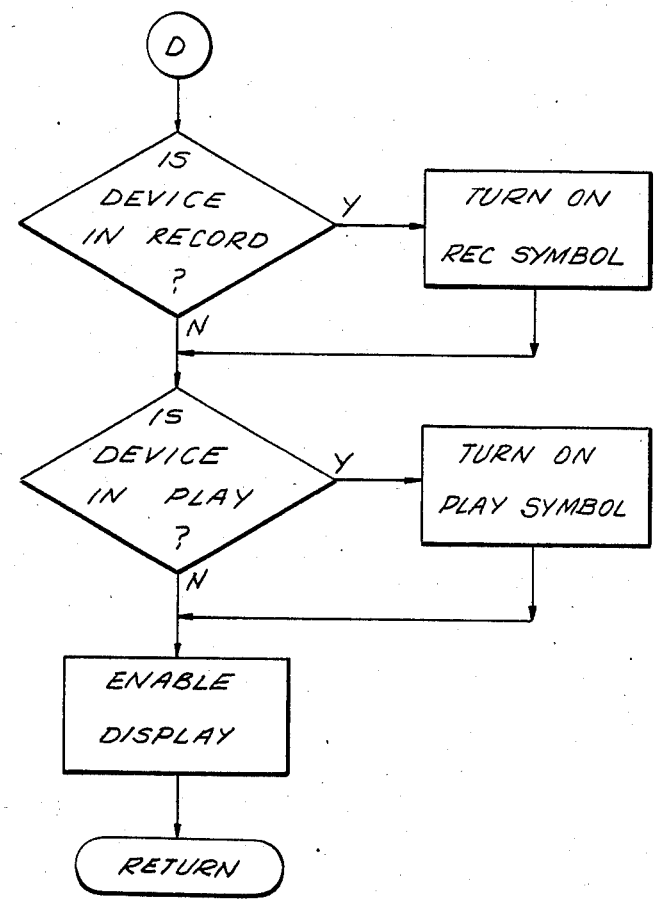

If the graph flag is not set, bar graph element 10 is conditioned to be turned on, and the routine then advances to point D of the flow chart shown in FIG. 6D. However, if the graph flag is set, as when the steady-state bar graph display is to be provided during the record or playback modes of operation, all of the elements preceding element 10 are conditioned to be turned on, and element 10 is conditioned to be flashed, thus indicating the quantity of tape which has been consumed, or transported from the supply reel to the take-up reel, and further indicating the present position of the tape.

If the last, or tenth, bar graph element is not set or conditioned for energization, inquiry is made as to whether the next-preceding bar graph element, i.e. the ninth bar graph element, is set. If this inquiry is answered in the affirmative, inquiry next is made as to whether the graph flag is set. If the graph flag is not set, element 9 is conditioned to be turned on in the left-to-right or right-to-left shifting effect that will be provided by bar graph display 44. However, if the graph flag is set, all of the next preceding elements 1-8 are turned on and element 9 is conditioned to be flashed. Then, the microprocessor advances to point D of the flow chart in FIG. 6D.

If the ninth bar graph element is not set, the routine advances to inquire which of the next preceding bar graph elements is set and, once that particular element is identified, it is conditioned to be turned on if the graph flag is not set or, alternatively, if the graph flag is set, that element is conditioned to be flashed and all preceding elements are conditioned to be turned on. Thus, the routine proceeds through the flow charts shown in FIGS. 6B and 6C, eventually arriving at point D after conditioning the appropriate bar graph element(s) to be turned on or flashed.

As seen from point D of the flow chart shown in FIG. 6D, inquiry first is made as to whether device 10 is disposed in its record mode. If it is, the symbol REC is turned on. If this inquiry is answered in the negative, or after symbol REC has been turned on, inquiry next is made as to whether the device is disposed in its playback mode. If so, the symbol PLAY is turned on. Thereafter, or if the device is not disposed in its playback mode, display 40 is enabled, or energized, so as to display the appropriate symbol which has been turned on (i.e. the symbol REC, PLAY, LTR or INS), the appropriate numerical indication (i.e. the tape count or the number of the letter which is in condition for playback or which has just been recorded, or the number of the instruction which has been reached or which has just been recorded, depending upon whether the "tape count" or "cue" mode has been selected), and the bar graph display (i.e. the steady-state display which indicates the present position of the tape, or the shifting display which indicates fast forward or rewind movement of the tape). Then, the microprocessor returns to the main loop to execute the additional routines illustrated in FIG. 3 and described more particularly in the aforementioned copending application.

Record Routine

To the extent that it is helpful in understanding the display operation of the present invention, the record routine shown by the flow charts of FIGS. 7A and 7B now will be described. This routine is described in greater detail in aforementioned copending application Ser. No. 564,191 and is carried out in response to the operation of record button 24 or conference record button 22.

In executing the record routine, inquiry is made as to whether the record flag is set. If not, as when this is the first cycle through the record routine, steps which are described in the aforementioned copending application are followed, resulting in the return to the main loop. If, however, the record flag is set, the record routine advances to inquire whether any cue flag (i.e. the "letter" or "instruction" cue flag) is set. If no cue flag is set, inquiry next is made as to whether cue button 30 is being operated. If the cue button is not operated, the cue stop flag is set and the record routine advances to inquire if any cue signals (i.e. letter or instruction cue signals) are in the process of being recorded. If so, a cue generate routine (similar to that described in U.S. Pat. No. 4,378,577) is carried out and then inquiry is made as to whether the count of the binary tape counter is equal to a count stored in the location of the cue memory which is addressed by the cue address generator. Stated otherwise, inquiry is made as to whether the binary tape count is equal to a cue position count stored in the addressed cue memory location. From the flow chart of FIG. 7A, this inquiry also is made if cue signals are not in the process of being recorded.

If the preceding inquiry is answered in the affirmative, the record routine advances to inquire whether the last (e.g. the tenth) element of bar graph display 44 (FIG. 1) is energized. However, if the binary tape count is not equal to the cue position count stored in the addressed location of the cue memory, inquiry next is made as to whether the binary tape count is equal to any letter cue position count stored in the cue memory. If so, inquiry is made as to whether the count of a letter cue counter is greater than the letter cue memory location then being addressed. The microprocessor (or equivalent) includes a letter cue counter which is incremented each time a letter cue signal is recorded and an instruction cue counter which is incremented each time an instruction cue signal is recorded. The cue memory is comprised of a "letter" section and an "instruction" section, each adapted to store cue position counts representing the locations on the record medium at which ends of letters (or letter cue signals) or instructions (or instruction cue signals) are recorded. Preferably, letter cue position counts are stored in successive locations of the "letter" section of the cue memory and, likewise, instruction cue position counts are stored in successive locations of the "instruction" section of the cue memory. When a letter (or instruction) cue signal is recorded, both the letter (or instruction) cue counter and the letter (or instruction) cue memory address are incremented. Hence, the count of the letter (or instruction) cue counter and the letter (or instruction) cue memory address normally correspond to each other, e.g. they normally are equal. It is recalled from FIGS. 4B and 4C that the letter (or instruction) cue memory address is decremented when the record medium is rewound past the location of the end of a previously recorded letter or the location of a previously recorded instruction and is incremented when the record medium is advanced past such a location. Although the cue memory address is changed, the cue count is not because (insofar as the present discussion is concerned) only the recording of additional cue signals effects a change therein. Hence the cue count is not affected merely by the rewinding or advancing of the record medium.

Therefore, if the record medium had been rewound past two or more previously recorded letter cue signals and then, during the record routine, the first of these cue signal positions is detected, the inquiry of whether the letter cue count exceeds the letter cue memory address will be answered in the affirmative. Then, the cue position counts stored in those letter cue memory locations equal to and greater than the location then being addressed by the letter cue memory address are shifted down one position, with the cue position count stored in the addressed location being "overwritten" by the cue position count stored in the next higher location. For example, if the letter cue memory address now is "4" and the letter cue count is "6", the cue position count stored in location "5" is shifted down into location "4" and the cue position count stored in location "6" is shifted down into location "5". Next, the cue position count stored in the last or highest location (e.g. location "6" in the present example) is cleared. This last step also is carried out in the event that the binary tape count is equal to a stored letter cue position count but the letter cue count does not exceed the letter cue memory address. For example, if the record medium is reversed and then advanced to record information over the position at which the last letter cue signal was recorded, the cue position count representing that last letter cue signal simply is cleared from the cue memory.

After the letter cue position count stored in the last location of the cue memory is cleared, both the letter cue counter and the letter cue memory address are decremented.

Next, a similar set of steps is carried out for instruction cue position counts. That is, inquiry is made as to whether the binary tape count is equal to any instruction cue position count stored in the cue memory. It is seen from the flow chart of FIG. 7A that this inquiry also follows in the event that the binary tape count is not equal to any stored letter cue position count. If this inquiry is answered in the negative, the routine advances to inquire if the last (or tenth) element of bar graph display 44 is energized. However, if this inquiry is answered in the affirmative, inquiry next is made as to whether the instruction cue count exceeds the instruction cue memory address. If so, the instruction cue position counts stored in those instruction cue memory locations greater than the location then being addressed by the instruction cue memory address are shifted down one position. Next, the count stored in the last instruction cue memory location is cleared. This last step also is carried out in the event that the binary tape count is equal to a stored instruction cue position count but the instruction cue count does not exceed the instruction cue memory address.

After the instruction cue position count stored in the last location of the instruction cue memory is cleared, both the instruction cue counter and the instruction cue memory address are decremented. Then, inquiry is made of whether the last (or tenth) element of the bar graph display is energized.

If the last mentioned inquiry is answered in the negative, the microprocessor returns to the beginning of the main loop. However, if the last element of the bar graph display is being energized, inquiry of whether the end zone timer has reached a count equal to or greater than fifteen seconds is made. If not, the microprocessor returns to the beginning of the main loop. But, if this inquiry is answered in the affirmative, the end zone timer is reset, the tone timer is reset and the tone flag is set. The count of the end zone timer is used to control the generation of a warning tone which indicates that the end zone region has been reached; and this region corresponds to the energization of the last element of the bar graph display.

Figure 7A:
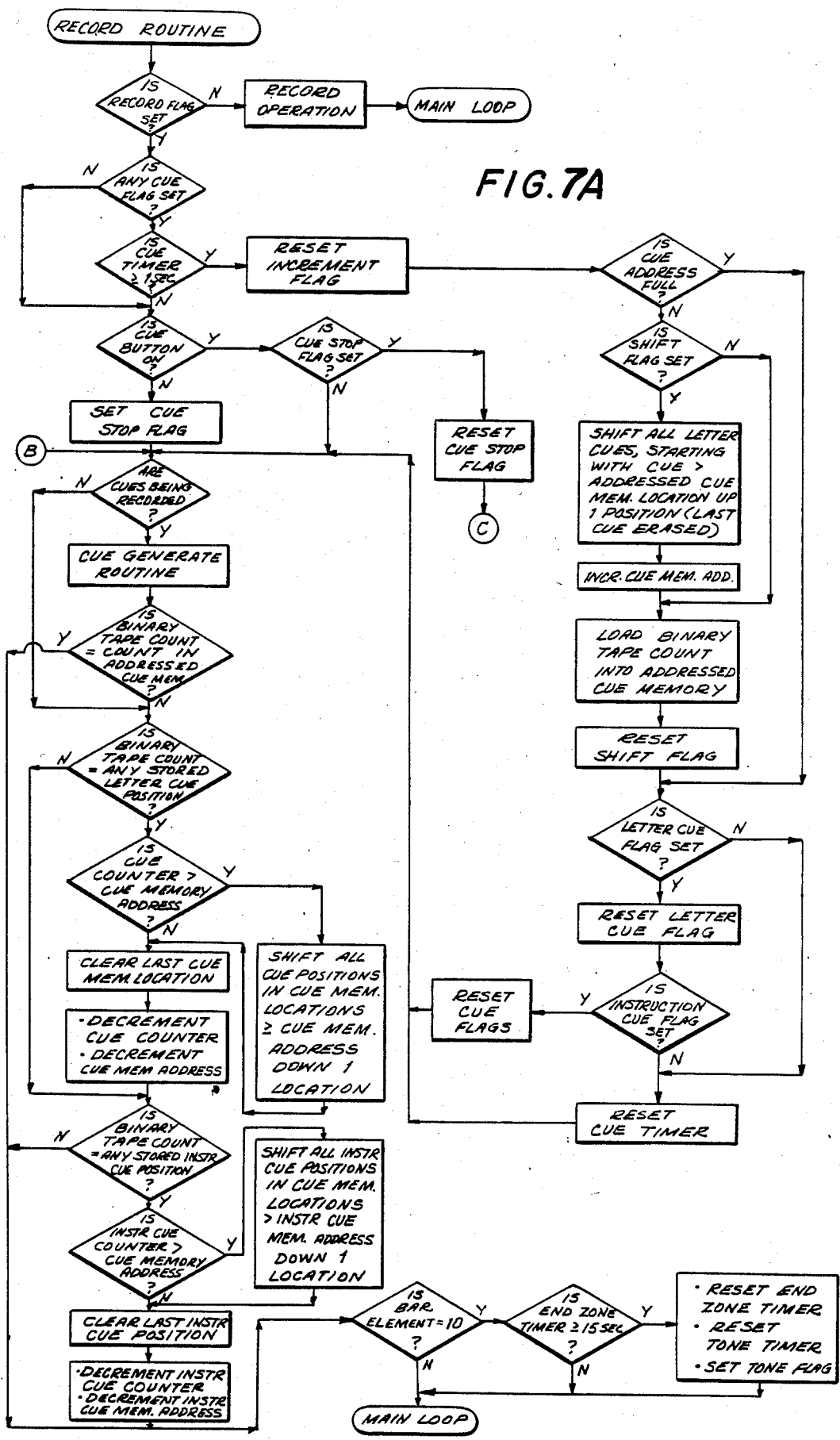

Returning to the beginning of the flow chart of FIG. 7A, let it be assumed that a letter or instruction cue flag has been set. The manner in which these flags are set will be described below with respect to the flow chart of FIG. 7B. Next, inquiry is made of whether the count of the cue timer is equal to or greater than one second. If it is not, inquiry then is made of whether the cue button is in the process of being operated. This inquiry has been discussed above, and the steps ensuing therefrom in the event that it is answered in the negative also have been described. If the count of the cue timer is less than one second and if the cue button is in the process of being operated, inquiry is made of whether the cue stop flag is set. Normally, this flag will be set and the record routine then advances to reset it and, thereafter, the routine proceeds to point C in the flow chart of FIG. 7B. However, if the cue stop flag is not set, for example, if this is the second cycle through the flow chart shown in FIG. 7A following the operation of the cue button, the record routine advances to inquire as to whether any cue signals are in the process of being recorded. The steps ensuing from this inquiry have been described in detail hereinabove.

Let it be assumed that, in the flow chart shown in FIG. 7A, a cue flag has been set and the count of the cue timer is at least equal to one second. The next step in the record routine is to reset an increment flag. From the discussion set out below, it will be apparent that, if desired, this step, as well as the increment flag, may be omitted.

Next, inquiry is made as to whether the cue memory is full. For example, if a letter cue signal is in the process of being recorded, this inquiry is determined by detecting whether the highest letter cue memory address (e.g. address "9") has been reached. Similarly, if an instruction cue signal is in the process of being recorded, this inquiry is determined by sensing if the highest instruction cue memory address has been reached. If so, that is, if the cue memory address is full and, thus, additional letter cue position counts or additional instruction cue position counts cannot be stored, the record routine advances, as shown in FIG. 7A, to inquire if the letter cue flag is set. However, if the cue memory is not full, that is, if there is an available location therein to store a letter cue position count now being produced or an instruction cue position count now being produced, inquiry is made as to whether a shift flag is set. As will be described below, the shift flag is set in the event that a letter or instruction cue signal is to be inserted between two previously recorded letter or instruction cue signals. If this shift flag is set, all letter cue position counts that are stored at letter cue memory addresses greater than the location now being addressed are shifted upward by one location; and if the letter cue memory had been filled, the letter cue position count that had been stored in the last location therein is cleared.

The aforementioned shifting operation will best be understood by a numerical example. Let it be assumed that eight letter cue position counts have been stored in locations "1" to "8" in the letter cue memory. Let it be further assumed that the record medium is rewound from its present position back through the eighth letter and then through the seventh letter and then into the sixth letter. It is recalled, from the aforedescribed reverse cue position routine (FIG. 4C) that, during this rewind operation, the letter cue memory address is decremented from its count of "8" to "7" to "6" and then, when the record medium is rewound to the beginning of the sixth letter, this letter cue memory address is decremented to a count of "5". Now, let it be assumed that the user of the device modifies the sixth letter which he recorded and now records an end-of-letter signal upstream of the location at which the sixth end-of-letter signal had been recorded previously. That is, a letter cue signal now must be inserted between the fifth and sixth letter cue signals that had been recorded previously. This is effected by shifting the letter cue position counts that had been stored at letter cue memory location "6", "7" and "8" upward by one location to new locations "7", "8" and "9", respectively. Thus, the letter cue position count that had been stored at letter cue memory location "6" is shifted into location "7", thereby making location "6" available to store the letter cue position count now generated in response to the operation of the cue button. From the foregoing numerical example, it is appreciated that those letter cue position counts which were stored at locations greater than the letter cue memory location now being addressed (e.g. those locations greater than location "5") are respectively shifted upward by one location.

Returning to the flow chart shown in FIG. 7A, after the aforementioned shifting operation is carried out, the letter cue memory address is incremented; and then the binary tape count then present in the binary tape counter is loaded into the addressed letter cue memory location. Consistent with the aforedescribed numerical example, the letter cue memory address of "5" first is incremented to address location "6"; and the count then present in the binary tape counter is loaded into location "6". Hence, the location in the letter cue memory which has been made available to store an inserted cue position count now receives that count. Consequently, the successive locations within the letter cue memory have the contents thereof shifted upward accordingly in order to allow an additional cue position count to be inserted at the proper memory location.

In the event that the shift flag was not set, the count of the binary tape counter merely is shifted into the location of the letter cue memory now being addressed. That is, the aforementioned shifting operation is omitted if the shift flag is not set.

After the count of the binary tape counter is loaded into the addressed letter cue memory location, the shift flag is reset. Then, inquiry is made as to whether the letter cue flag is set. As will be described, this letter cue flag is set in response to the first operation of the cue button to indicate that the letter cue signal is being recorded. If the cue button is operated once again within one second, that is, before the count of the cue timer reaches one second, the instruction cue flag will be set. In any event, the present inquiry of whether the letter cue flag is set is reached only after the count of the cue timer reaches one second. Hence, if the letter cue flag is set at that time, it then is reset and inquiry is made of whether the instruction cue flag is set. If it is, all of the cue flags (including the instruction cue flag) are reset; and the record routine advances to the set of instructions commencing with the inquiry of whether any cue signals are being recorded.

However, if the letter cue flag is not set or, alternatively, if it is but the instruction cue flag is not set, the record routine first resets the cue timer and then advances to the set of instructions commencing with the inquiry of whether any cue signals are being recorded.

Figure 7B:
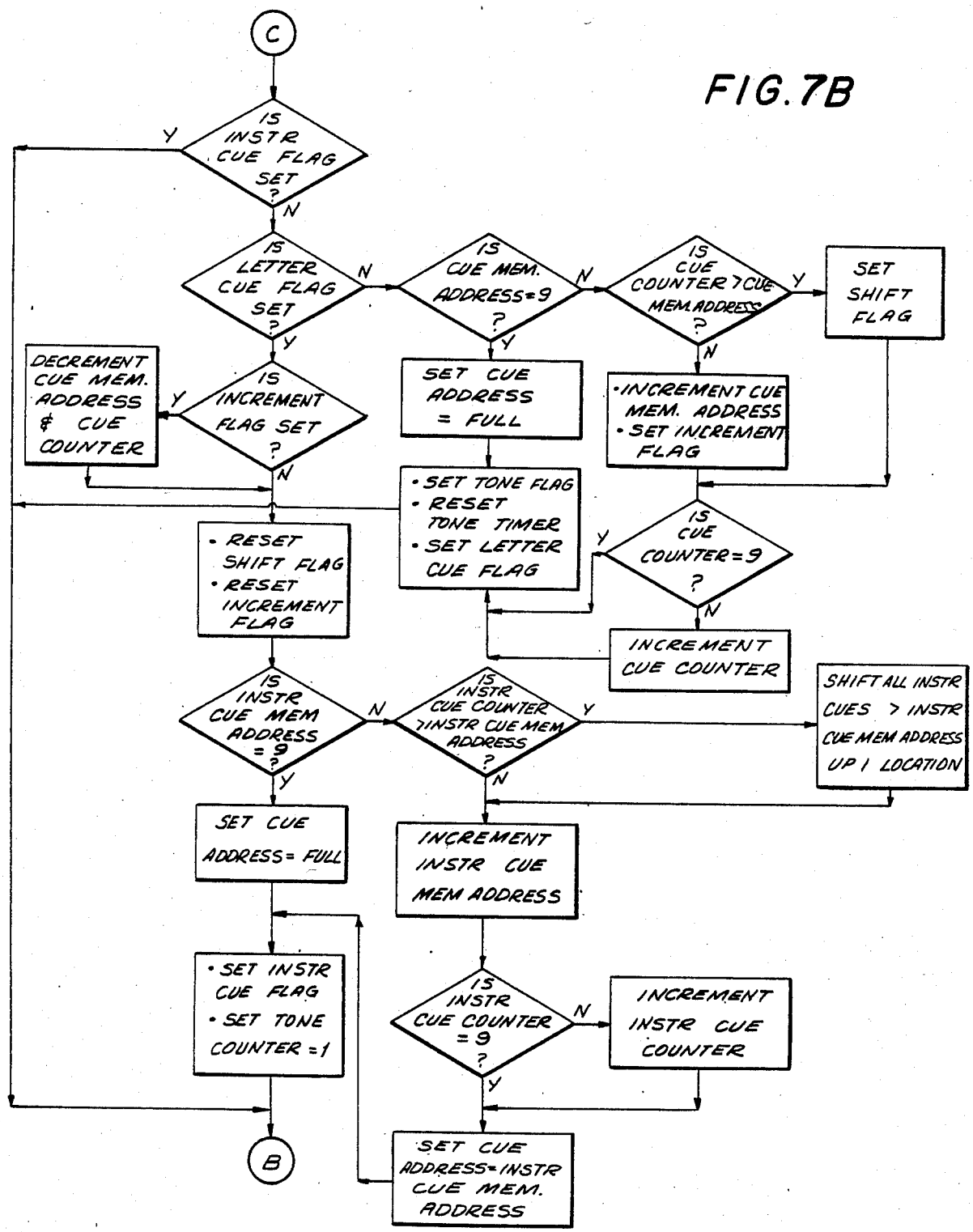

In the flow chart of FIG. 7A, the initial operation of the cue button results in resetting the cue stop flag, whereupon the record routine advances to point C of the flow chart shown in FIG. 7B. From this point, inquiry is made of whether the instruction cue flag is set. If it is, the record routine merely returns to point B of the flow chart shown in FIG. 7A. However, if the instruction cue flag is not set, inquiry next is made as to whether the letter cue flag is set. If it is, inquiry is made as to whether the aforementioned increment flag is set. As referred to above, this flag may be omitted; but, in the embodiment described herein, it is set when the cue button first is operated, thus conditioning the record routine to respond to the repeated operation thereof, as when an instruction cue signal is recorded. If the increment flag is set, the cue memory address and cue counter are decremented. As will be described, when the cue button first is operated both the cue counter and cue memory address are incremented to indicate the recording of another cue signal and to permit the cue position count corresponding thereto to be stored in the next successive address. However, this assumes that the cue signal which is being recorded is a letter cue signal. If the operator is, in fact, recording an instruction cue signal, the cue counter and cue memory address should be decremented at this stage in the instructions to restore both to their conditions prior to the first operation of the cue button. That is, the cue memory address now addresses the proper location for storing an instruction (as opposed to a letter) cue position count, and the cue counter now is conditioned to indicate the recording of an instruction (as opposed to a letter) cue signal.

If the increment flag has not been set or, alternatively, after the cue memory address and cue counter are decremented, the shift flag and the increment flag both are reset.

Let it be assumed that neither the instruction cue flag nor the letter cue flag is set. Proceeding with the record routine shown in FIG. 7B, inquiry next is made as to whether the letter cue memory address is equal to the highest location in the letter cue memory. For the purpose of the present description, it is assumed that a maximum of nine letter cue position counts may be stored in the cue memory. Of course, it is appreciated that any desired maximum number of letter and instruction cue position counts may be stored. The present discussion will proceed with the assumption that the maximum number of such cue position counts is equal to nine. If this inquiry is answered in the negative, inquiry next is made as to whether the letter cue count exceeds the letter cue memory address. A similar inquiry has been discussed hereinabove in conjunction with the flow chart shown in FIG. 7A, wherein the record medium is advanced to record information over a location at which the end of a letter had been recorded previously.

If the letter cue count does not exceed the letter cue memory address, the letter cue memory address is incremented and the increment flag is set. It will be appreciated that, by incrementing the letter cue memory address, the next successive location in the letter cue memory is addressed to receive the binary tape count. Next, inquiry is made of whether the cue count has reached its maximum count (assumed herein to be the count of nine). If not, the cue counter is incremented. Thereafter, the tone flag is set, the tone timer is reset and the letter cue flag is set. These flags and timers are set and reset in the same manner in the event that the cue count is equal to nine, but in that case, the cue count is not further incremented. Then, the record routine advances to point B shown in FIG. 7A.

If the cue memory address is equal to a count of 9, the cue address is preset to a count representing that the cue memory is full; and then the tone flag and letter cue flag are set, and the tone timer is reset. However, if the cue memory address is not equal to a count of 9, but the cue count exceeds the cue memory address, the shift flag is set. From FIG. 7B, it is seen that, when the shift flag is set, the steps of incrementing the cue memory address and setting the increment flag are bypassed.

The following instructions are carried out in the event that the instruction cue flag is not set and the letter cue flag is set. Proceeding with the flow chart shown in FIG. 7B, and following the step of resetting both the shift flag and the increment flag, it is seen that inquiry is made as to whether the instruction cue memory address is equal to a count of 9 (i.e. the maximum count). If it is, the cue address is preset to a count representing that the instruction cue memory is full; and then the instruction cue flag is set and the tone counter is set to a count of 1. The record routine then advances to point B shown in FIG. 7A.

However, if the instruction cue memory address is not equal to a count of 9 (that is, if it is not equal to the maximum number of instruction cue storage locations), inquiry is made as to whether the instruction cue count exceeds the instruction cue memory address. A similar inquiry has been described above with respect to the flow chart of FIG. 7A. If this inquiry now is answered in the affirmative, those instruction cue position counts which are stored at instruction cue memory locations greater than the present instruction cue memory address are respectively shifted upward by one location; and if an instruction cue position count had been stored at location "9", this position count is cleared. Then, the instruction cue memory address is incremented. It is seen that this address also is incremented if the instruction cue count does not exceed the instruction cue memory address.

After the instruction cue memory address is incremented, inquiry is made as to whether the instruction cue count is equal to 9. If not, this count is incremented. However, if the instruction cue count is equal to 9, the last-mentioned step is omitted and the cue address now is set equal to the instruction cue memory address. Thereafter, the instruction cue flag is set and the tone counter is set to a count of 1. The record routine then advances to point B of FIG. 7A.

In the present example, it is seen that the cue address normally coincides with the letter cue memory address, except when an instruction cue signal is recorded. At that time, the cue address is changed over to correspond to the instruction cue memory address. Thus, the cue memory is addressed merely by a single cue address generator which, of course, selects suitable locations in the letter or instruction sections of the cue memory.

Rewind Routine

As described more particularly in the aforementioned copending application Ser. No. 564,191, the rewind routine is carried out if the rewind button is operated. The rewind routine is diagrammatically represented by the flow chart shown in FIG. 8, wherein inquiry first is made as to whether the rewind flag is set. This flag is set when all the conditions needed to carry out a rewind operation are satisfied.

If the rewind flag is not set, instructions for executing a rewind operation are carried out, as described in the aforementioned copending application. Ultimately, this flag is set and, in subsequent cycles through the rewind routine, the inquiry of whether the rewind flag is set will be answered in the affirmative. Then, the capstan motor is set and remains energized for reverse operation; and inquiry next is made as to whether the in erase flag is set, i.e. whether previously recorded information is being erased from the tape. If not, the microprocessor advances to the cue pause routine, described in the aforementioned copending application. However, if the in erase flag is set, an erase operation is carried out and a cue erase routine is executed. After the cue erase routine is performed, the count of an erase timer is checked to control the generation of warning tones that apprise the user of an erase operation.

The cue erase routine commences with the inquiry of whether the count of the binary tape counter is equal to any stored letter cue position count. If not, the cue erase routine jumps to inquire whether the count of the binary tape counter is equal to any stored instruction cue position count. If not, the microprocessor continues with the rewind routine.

If the count of the binary tape counter is equal to a stored letter cue position count, inquiry next is made as to whether the letter cue count exceeds the letter cue memory address +1. This adding of the constant "1" to the cue memory address is needed because, it is recalled, during a rewind operation, the cue memory address is decremented when the location on the record medium is reached at which a letter cue signal had been recorded previously. The letter cue count will exceed the cue memory address +1 if additional letter cue position counts had been inserted between previously recorded letter cue position counts. If this inquiry is answered in the negative, thus indicating that the end of the last-recorded letter has been reached, the letter cue position count stored in the last, or highest, location in the letter cue memory is cleared therefrom, and the letter cue counter is decremented. However, if the aforementioned inquiry is answered in the affirmative, the steps of clearing the last location in the letter cue memory and decrementing the letter cue counter are preceded by the step of shifting downward by one location all of the letter cue position counts which are stored at locations in the letter cue memory which exceed the letter cue memory address +1.

If the count of the binary tape counter is equal to a stored instruction cue position count, inquiry is made as to whether the instruction cue count exceeds the instruction cue memory address +1. If not, the last, or highest, location in the instruction cue memory at which an instruction cue position count has been stored is cleared, and the instruction cue count is decremented. However, if this inquiry is answered in the affirmative, the last-mentioned steps are preceded by the step of shifting downward by one location all instruction cue position counts which are stored at locations in the instruction cue memory that exceed the instruction cue memory address +1. Thereafter, the microprocessor continues the rewind routine.

Operation of the Processor-Controlled Display

The manner in which the microprocessor controls the operation of display 40 in accordance with the aforedescribed routines will best be understood by brief descriptions of certain commanded operations. Initially, let it be assumed that the microprocessor and the device both are disposed in the dormant condition. When keyboard enable button 36 is operated (FIG. 2), the microprocessor leaves its dormant condition, carries out the power-up routine and then advances to the main loop. It will be appreciated that the dormant condition is not re-assumed unless the device remains in its inactive (or stop) mode for a predetermined time (e.g. five minutes) or, in another embodiment, until the keyboard enable button is operated once again to trigger the dormant condition.

When in the main loop (FIG. 3), the tone and timer update routine is carried out, followed by the tape counter update routine. Turning to FIG. 4A, when tape is driven in the forward direction, the BCD and binary tape counters both are incremented in response to 1/0 chopper pulse transitions, and the binary tape counter is additionally incremented in response to 0/1 transitions. These counters are decremented in response to the foregoing transitions when the tape is driven in the reverse direction. Also, the bar graph display routine (FIG. 5) is carried out in response to 1/0 transitions to determine the average separation between successive chopper pulse transitions and condition the appropriate bar graph element for energization in accordance with that separation.

If tape is not transported, as when device 10 is disposed in its inactive mode, chopper pulse transitions are not produced. Since the capstan is not operating in the inactive mode, the EOT timer remains reset during each cycle through the tape counter update routine. However, if the capstan is operating but tape is not being transported, no chopper pulse transitions are sensed and, ultimately, the EOT timer will be incremented (during the tone and timer update routine) to a count equal to or greater than 3.5 seconds. This indicates that the end of tape has been reached and, as shown in the flow chart of FIG. 4A, the capstan is deactivated, the EOT flag is set and the tone counter is preset to a count for generating interrupted audible tones to apprise the operator that the end of tape has been reached.

If tape is being transported, as in the "record", "play", "fast forward" or "rewind" modes, chopper pulse transitions are generated and used to increment or decrement the binary tape counter. After the count of this tape counter is updated, the forward or reverse cue position routine is carried out. As mentioned above, the purpose of these routines is to sense when the tape has been transported past a previously recorded letter or instruction cue signal, whereupon the cue memory address is updated (incremented or decremented) to identify the cue memory storage location in which is stored the cue position count representing the location on the tape at which that letter or instruction cue signal is recorded. Thereafter, the remainder of the tape counter update routine, illustrated in the flow chart shown in FIG. 4A, is completed; and the microprocessor then turns to and continues through the main loop.

Returning to FIG. 3, it is assumed that reset/mode button 32 is not operated, the reset timer flag is not set, and the "tape count" display mode for display 40 is selected to display tape counts. If the reset/mode button had been operated momentarily, e.g. for less than one second, display 40 would be toggled to the "cue" display mode to display the particular letter, or message, which is being recorded. That is, a number corresponding to or derived from the presently generated letter cue memory address would be displayed. After selecting the display mode by operation of the reset button routine, the display routine is carried out. For the purpose of the present description, the display routine is assumed to include both the bar graph display routine (FIG. 5) and the alphanumeric and tape direction routine (FIGS. 6A–6D) which routines may be carried out in succession or at separate points in the main loop (e.g. the bar graph display routine may be executed during the tape counter update routine).

If a fresh tape cassette is loaded into device 10, the cue memory is cleared, the cue counter and cue memory address are preset, the tape counters are reset and all other cue flags that might have been set are reset. Since the device is disposed in its stop mode, it is assumed, at this time, that the bar graph is not being displayed and, as shown in FIG. 5, no bar graph element is set; and numerical display 42 is reset to [000]. If a used cassette is removed while the device is in its dormant condition, a latch is triggered; and this is sensed when the microprocessor is brought out of the dormant condition to then clear the cue memory, preset the cue counter and cue memory address, reset the tape counters and reset the aforementioned other cue flags.

Let it be assumed that the user now operates momentary record button 24. From the aforementioned copending application, this results in the execution of the record routine shown herein in FIG. 7A. At this time, the record flag is not yet set and the steps associated with initiating a recording operation are carried out. Eventually, the record flag is set.

Once device 10 is disposed in the record mode, tape is advanced and chopper pulse transitions are detected. As mentioned above, the binary tape count is incremented in response to each 1/0 and each 0/1 transition. The BCD tape counter, however, is incremented only in response to the 1/0 transitions. Nevertheless, the count of the BCD tape counter is sufficient to provide an accurate representation of the location of tape; and this count may be displayed by numerical display 42.

After the tape counters are updated, the EOT timer is reset and the tape counter update routine then exits and the main loop is continued.

Once again the reset button routine is carried out to sense if the reset button has been operated and, if so, whether it has been pushed for less than one second to toggle the display mode of numerical display or for more than one second to reset the BCD counter. Thereafter, the graph timer and the letter display timer are updated. (It is recognized that these timers may be updated during the tone and timer update routine or during any other convenient portion of the microprocessor cycle.)

Proceeding with the bar graph display routine, since the record mode is established, the inquiry of whether the bar graph is being displayed is answered in the affirmative. Tape is moving and, as shown in FIG. 5, the time interval counter is incremented. Assuming that at least four previous time interval counts have been stored, these counts are averaged to produce an average interval count representing the separation between successive chopper pulse transitions. This average interval count is used to set the appropriate bar graph element to represent the amount of tape that has been transported from the supply reel to the take-up reel and, thus, the present position of the tape. If the same bar graph element has been set eight times in succession, i.e. during eight successive cycles through the bar graph display routine, it is conditioned to be energized.

Assuming that, when the microprocessor cycles through the alphanumeric and tape direction routine (FIG. 6A), the battery level is not low, the capstan is not being driven in reverse or in fast forward, the graph flag is set (because the device is disposed in its record mode) and the device is operating in its record mode of operation. It is assumed that neither the instruction cue flag nor the letter cue flag is set because cue button 30 is not on. The inquiry of whether the display letter flag is set is answered in the negative, and the next inquiry of whether display 40 is in its "cue" display mode also is answered in the negative. Hence, the symbols, LTR and INS are cleared and the count of the BCD counter is displayed by numerical display 42. Proceeding with the flow charts of FIGS. 6B and 6C, it is assumed that, at this time, only a small quantity of tape has been payed out from the supply reel and that the first bar graph element is set. This element is flashed and, continuing with the flow chart of FIG. 6D, the symbol REC is turned on and display 40 is enabled to display the flashing bar graph element and to display the BCD tape count. After the display routine is executed, the main loop (FIG. 3) carries out the input routine and then the record (operating) routine shown in FIG. 7A. The record flag is set, and it is assumed that neither the "letter" nor the "instruction" cue flags are set and that the cue button is not on. Hence, the cue stop flag is set and then a comparison is made between the binary tape count and the cue position count stored in the addressed location of the letter cue memory. At this time, however, it may be assumed that the letter cue memory address has been preset to a "not present" address or, alternatively, the binary tape count is not equal to whatever cue position count may be stored in the letter cue memory location now being addressed. Hence, the inquiry of whether the binary tape count is equal to a cue position count stored in the addressed cue memory is answered in the negative. At this time it is further assumed that the binary tape count is not equal to any stored letter or instruction cue position count. Accordingly, inquiry next is made as to whether the last, or tenth, element of bar graph 44 is energized. This inquiry normally will be answered in the negative until most of the tape has been consumed. At that time, the tape will have been advanced to its so-called end zone region.

Let it now be assumed that, during the recording operation, the tape has been sufficiently advanced so as to reach its end zone region. During tape movement up to this point, the bar graph display routine will operate to set successive bar graph elements, the alphanumeric and tape direction routines will operate to update the tape count displayed, and those bar graph elements which precede the one element that is set will be energized. Now, it is assumed that the tenth bar graph element is set and is flashed. The inquiry, during the record routine, of whether this element is energized will be answered in the affirmative. The next following inquiry of whether the count of the end zone timer is greater than or equal to fifteen seconds also will be answered in the affirmative. It is appreciated that this timer is incremented when the microprocessor cycles through the tone and timer update routine and, advantageously, remains at a predetermined maximum count well beyond a count of fifteen seconds notwithstanding further attempts to increment this timer as the microprocessor continues to cycle. Now, both the end zone timer and the tone timer are reset and the tone flag is set. Consequently, an end-zone warning tone is generated.

As the microprocessor continues to cycle through the record routine, inquiry is made, at each cycle therethrough, as to whether the end zone timer is equal to or greater than fifteen seconds. At the present time, since the end zone timer had just been reset, this inquiry is answered in the negative. At subsequent cycles of the microprocessor through the record routine, inquiry again is made as to whether the count of the end zone timer is equal to or greater than fifteen seconds, and ultimately, the end zone timer will be so incremented. As a result, the end zone timer and tone timer are reset once again, resulting in end-zone warning tones recurring at a rate of one warning tone pulse every fifteen seconds.

Let it be assumed that, while in the record mode, the tape is transported to its end. When this occurs, the supply reel no longer rotates and, therefore, chopper pulse transitions no longer are produced. When the main loop periodically carries out the tape counter update routine, the inquiries as to whether a 1/0 or 0/1 chopper pulse transition is present both will be answered in the negative, the inquiry as to whether the EOT flag is set will be answered in the negative and the inquiry as to whether the capstan motor is on will be answered in the affirmative. The following inquiry of whether the count of the EOT timer is equal to or greater than 3.5 seconds will be answered in the negative during successive cycles through the tape counter update routine (it had been reset in response to each chopper pulse transition) until, ultimately, the EOT timer is sufficiently incremented during the tone and timer update routine such that this inquiry eventually is answered in the affirmative. Thus, 3.5 seconds after the supply reel stops rotating, the capstan motor will be turned off, the EOT flag will be set and the tone counter will be set to a count of ten. When the end of tape is reached, for as long as the momentary record button remains operated, a pulsating warning tone is produced having an on duration of about one second and an off duration of about 0.5 seconds. A total of ten warning tone pulses are produced, if the momentary record button remains operated.

At any time that the momentary record button is released, even if the tape has been advanced into its end zone region or even if the end of tape has been reached, the microprocessor will jump to the stop routine described more particularly in the aforementioned copending application.

Now, let it be assumed that, while in the record routine, the user wishes to record a "letter" cue signal. As shown by the flow chart of FIG. 7A, since the record flag is set, inquiry is made as to whether any cue flag is set. This inquiry is answered in the negative; and if cue button 30 is operated, inquiry of whether the cue button is on is answered in the affirmative. Inquiry now is made as to whether the cue stop flag is set. It is recalled that, when the record routine is carried out, the cue stop flag normally is set if the cue button is not operated. Hence, the inquiry of whether the cue stop flag is set now will be answered in the affirmative. This cue stop flag then is reset and, proceeding to point C of FIG. 7B, since neither the "instruction" nor the "letter" cue flags are set, the microprocessor advances to inquire if the letter cue memory address is equal to "9". It is assumed herein that the letter cue memory address has been preset to, for example, "0" and that the letter cue counter has been preset to the same (or corresponding) count. Since the letter cue count is not greater than the letter cue memory address, the routine shown in FIG. 7B advances to increment the letter cue memory address (from "0" to "1") and to set the increment flag. Next, since the letter cue counter is not equal to "9", it is incremented (from "0" to "1") and then the tone flag is set, the tone timer is reset and the letter cue flag is set. The microprocessor then returns to point B of the flow chart in FIG. 7A.

From point B, inquiry is made as to whether a cue signal is being recorded. Since it is, the cue generate routine is carried out. Then, inquiry is made if the binary tape count is equal to a cue position count now stored in the letter cue memory location which is addressed by the letter cue memory address generator (e.g. address "1"). This addressed location has been assumed to be empty, and the answer to this inquiry is in the negative. It is further assumed that the binary tape count is not equal to any stored letter cue position count or any stored instruction cue position count, and that the last element of the bar graph display is not energized. Consequently, the microprocessor returns to the beginning of the main loop.

After cycling through the tone and timer update routine and the tape counter update routine, the microprocessor executes the reset button routine. It is assumed, at this time, that the reset button has not been operated and that the reset timer flag is not set. Accordingly, the graph timer and letter display timer both are updated; and the microprocessor then advances to the display routines described herein.

The bar graph display routine (FIG. 5) is carried out to set the appropriate bar graph element depending upon the average separation between successive chopper pulse transitions. Hence, the approximate present position of the tape is displayed by bar graph display 44, together with a display of the amount of tape which has thus far been consumed (i.e. transported from the supply reel to the take-up reel).

Proceeding with the alphanumeric and tape direction routine (FIGS. 6A–6D), the energy level of the battery is not low, the capstan is not being driven in reverse, nor is the capstan being driven in fast forward, and the graph flag is set. Furthermore, device 10 is disposed in its record mode and the instruction cue flag is not set. At this time, the inquiry of whether the letter cue flag is set is answered in the affirmative. It is recalled, from the flow chart shown in FIG. 7B, that this letter cue flag had been set during the preceding cycle of the microprocessor through the record routine. Accordingly, the flow chart of FIG. 6A proceeds to set the display letter flag. Then, proceeding with the alphanumeric and tape direction routine, since the "cue" display mode has not been selected, the symbols LTR and INS are cleared, and numerical display 42 continues to display the present tape count.

Proceeding with the flow charts shown in FIGS. 6B and 6C, depending upon the particular graph element which was set by the bar graph display routine, that element is conditioned to be flashed and those elements which precede it are conditioned to be turned on. The routine then advances to point D of the flow chart shown in FIG. 6D, whereupon the symbol REC is turned on and display 40 is enabled to display the present tape count and to display, via bar graph display 44, the present position of the tape.

The microprocessor then returns to the main loop and continues to carry out the input routine and operating routine, as mentioned above and described in greater detail in the aforementioned copending application.

On executing the operating routine, the record routine shown in FIG. 7A is carried out. Since the record flag is set, inquiry is made of whether any cue flag is set, and this inquiry is answered in the affirmative. The cue timer was reset upon initiating the cue generate routine, and the inquiry of whether the count of this cue timer is equal to or greater than one second is answered in the negative. Assuming that the cue button still is on, since the cue stop flag now is reset, and since a cue signal is being recorded, the routine advances to the cue generate routine. The microprocessor then inquires whether the binary tape count is equal to a cue position count stored in the addressed cue memory. This inquiry is answered in the negative (it is assumed that no count has been stored in cue memory location "1") and the inquiry of whether the binary tape count is equal to any stored letter cue position count also is answered in the negative. Hence, the routine advances to inquire if the binary tape count is equal to any stored instruction cue position count. This too is answered in the negative, and the microprocessor returns to the beginning of the main loop.

The microprocessor continues to cycle through the bar graph display routine to select and flash the particular element determined by the measured separation between successive chopper pulse transitions, and through the alphanumeric and tape direction routine to control numerical display 42 to display the present tape count. Eventually, when the microprocessor cycles through the record routine (FIG. 7A), the count of the cue timer will have arrived at a count equal to one second. Then, the inquiry of whether the count of the cue timer is equal to or greater than one second is answered in the affirmative. Hence, the increment flag (which had been set during the initial cycle through the flow chart of FIG. 7B) is reset and, since the letter cue memory address is not full (it now is set to the address "1"), and since the shift flag is not set, the binary tape count is loaded into the addressed letter cue memory location (i.e. location "1"). Although the shift flag is not set, it nevertheless is reset. Since the letter cue flag had been set, it now is reset and, since the instruction cue flag is not set, the cue timer is reset.

The microprocessor then advances, as shown in FIG. 7A, to answer in the negative the inquiry of whether a cue signal now is being recorded (the letter cue flag has been reset), and the inquiry of whether the binary tape count is equal to the cue position count stored in the addressed location (location "1") of the cue memory is answered in the affirmative. Accordingly, the microprocessor returns to the beginning of the main loop.

It is seen that the recording of the "letter" cue signal has no affect upon the bar graph display routine shown in FIG. 5. When the microprocessor next cycles through the alphanumeric and tape direction routine (FIG. 6A), the inquiries of whether the battery level is low, whether the capstan is operating in its reverse mode, and whether the capstan is operating in its fast forward mode all are answered in the negative. The inquiries of whether the graph flag is set and whether the device is disposed in its record mode both are answered in the affirmative. The instruction cue flag is not set and now, however, the next-following inquiry of whether the letter cue flag is set is answered in the negative because this flag had been reset during the preceding cycle through the record routine of FIG. 7A. The microprocessor advances to inquire if the display letter flag is set. It is recalled that this flag had been set during the initial cycle through the alphanumeric and tape direction routine following the setting of the letter cue flag. Accordingly, this inquiry is answered in the affirmative.

Proceeding with the flow chart shown in FIG. 6A, the inquiry of whether the letter timer flag is set is answered in the negative and, thus, this flag now is set and the letter display timer is reset. Then, the symbol LTR is set, the symbol INS is reset and numerical display 42 is conditioned to display the number of the letter which has just been recorded, i.e., it is conditioned to display a number corresponding to or derived from the address presently generated by the letter cue memory address generator. In the present example, the numerical display now is conditioned to display the numeral "1". Then, the alphanumeric and tape direction routine advances to the flow charts shown in FIGS. 6B and 6C to cause the flashing of the bar graph element which has been set and to energize all of the next preceding bar graph elements. Then, advancing to the flow chart shown in FIG. 6D, since device 10 still is in its record mode, the symbol REC remains on, and display 40 now is enabled to display the number of the letter which has just been recorded and the bar graph which has been controlled by the bar graph display routine of FIG. 5.

When the microprocessor next cycles through the record routine, the record flag still will be set but now the inquiry of whether any cue flag is set will be answered in the negative. Assuming that the cue button is not operated once again, the cue stop flag is set. The record routine then proceeds in the manner described above.

Also, the microprocessor continues to cycle through the bar graph display routine and through the alphanumeric and tape direction routine, the latter effecting the display of the number of the letter which has just been recorded. Eventually, when cycling through the alphanumeric and tape direction routine, the count of the latter display timer will be incremented to a count that exceeds one second. Hence, after the inquiry of whether the letter timer flag is set is answered in the affirmative, the inquiry of whether the count of the letter display timer is greater than one second now will be answered in the affirmative. At that time, the display letter flag is reset and the letter timer flag also is reset. The microprocessor then advances to inquire if the "cue" display mode has been selected. Since the reset button had not been operated to toggle the display mode, this inquiry will be answered in the negative. Therefore, the symbol LTR will be cleared and numerical display 42 now will be supplied with the BCD tape count.

Thus, it is seen that, when a "letter" cue signal is recorded, that is, when the user operates cue button 30 to indicate the end of a recorded letter, the symbol LTR is displayed and the number of that letter also is displayed for a predetermined duration (e. g. the one second time out interval of the letter display timer) following the timing out of the cue timer.

Let it now be assumed that, during the record operation, the user wishes to record an "instruction" cue signal. This is achieved by the repeated operation of cue button 30 within a brief period of time, that is, within a period of about one second. Upon the first operation of the cue button, when the record routine (FIG. 7A) is carried out, the inquiry of whether the record flag is set is answered in the affirmative, the inquiry of whether any cue flag is set is answered in the negative and the inquiry of whether the cue button is on is answered in the affirmative. Accordingly, the inquiry of whether the cue stop flag is set is answered in the affirmative and, after resetting this cue stop flag, the routine advances to point C of FIG. 7B and the inquiry of whether the "instruction" cue flag is set is answered in the negative. Since the "letter" cue flag is not set at this time, the microprocessor proceeds to inquire if the letter cue memory address is set at "9", which would indicate that all of the letter cue memory locations are filled. This inquiry is answered in the negative and, since the letter cue count is equal to the letter cue memory address, the letter cue memory address is incremented and the increment flag is set. Assuming that, until the letter cue memory was just incremented, the letter cue count and the letter cue memory address were equal, the next inquiry of whether the letter cue count is set at "9" is answered in the negative and this cue count is incremented. Then, the tone flag and letter cue flag are set and the tone timer is reset. This results in the generation of a suitable warning tone. The momentary record routine then advances to point B (FIG. 7A) and the remainder of this routine is carried out in the manner described above.

On the next cycle of the microprocessor through the bar graph display routine, the appropriate bar graph element is set in the manner described hereinabove. It is recalled, that depending upon the particular element which has been set, this element is flashed and all of the next preceding elements are turned on to provide a bar graph display of the present position of the tape and the amount of tape which thus far has been consumed.

The microprocessor proceeds to the alphanumeric and tape direction routine wherein the initial inquiries are answered in the manner discussed above. When the inquiry of whether the device is disposed in its record mode is reached, this inquiry is answered in the affirmative, and the next inquiry of whether the instruction cue flag is set is answered in the negative. Since the letter cue flag was set during the preceding cycle of the microprocessor through the record routine, the display letter flag now is set. Then, since the "cue" display mode has not been selected, the symbols LTR and INS are cleared and the present count of the tape counter is displayed. The alphanumeric and tape direction routine then proceeds through the flow charts shown in FIGS. 6B–6D; and the microprocessor then continues with the main loop.

Upon the next cycle through the record routine, since the record flag is set and the "letter" cue flag is set, the inquiry of whether the count of the cue timer, which had just been reset during the cue generate routine, is greater than one second is answered in the negative. Since the cue button is still on and the cue stop flag is not set, the remainder of the flow chart shown in FIG. 7A is carried out.

The foregoing cycling through the display routine and the record routine continues until the cue button is released. Let it be assumed that this button is released before the time that the cue timer count reaches one second. As shown in FIG. 7A, when the cue button is released, the cue stop flag is set. Of course, the letter cue flag remains set until the cue button is operated once again or until the cue timer reaches the count of one second. From the alphanumeric and tape direction routine, it is seen that, so long as the letter cue flag remains set, display 40 displays the present count of the tape counter.

Let it now be assumed that, prior to the time that the count of the cue timer reaches one second, the cue button is operated once again. When the record routine next reaches the inquiry of whether the cue button is on (FIG. 7A), this inquiry is answered in the affirmative and the inquiry of whether the cue stop flag is set also is answered in the affirmative. Hence, the cue stop flag now is reset and, proceeding to point C of FIG. 7B, since the "instruction" cue flag is not yet set, inquiry is made as to whether the "letter" cue flag is set. This inquiry is answered in the affirmative and, since the increment flag had been set during the preceding cycle through the flow chart of FIG. 7B, the cue memory address and cue count which had been incremented in preparation for registering the recording of a letter cue signal now are decremented to their preceding counts because a letter cue signal is not recorded. The increment flag then is reset and the inquiry of whether the instruction cue memory address is set to "9" is answered in the negative because, it is assumed, that all available instruction cue memory locations have not yet been filled. Then, since the instruction cue count is not greater than the instruction cue memory address (because the tape has not been reversed past a previously recorded instruction signal), the instruction cue memory address is incremented to the next successive location. The instruction cue count is not set at "9" (which would indicate that the storage capacity of the instruction cue memory has been reached) and so it too is incremented, and the cue memory address is changed over from the letter cue memory address to the instruction cue memory address. Next, the instruction cue flag is set and the tone counter is preset to a count of one for controlling the generation of an instruction warning tone indication. Returning next to point B of FIG. 7A, the remaining instructions are carried out in the manner described above. It will be appreciated that, at this time, the binary tape count is not equal to the count stored in the location of the instruction cue memory now being addressed, nor is that tape count equal to any stored letter or instruction cue position count. Since the last element of the bar graph is not energized, the microprocessor returns to the beginning of the main loop.

When the microprocessor next cycles through the alphanumeric and tape direction routine, the initial inquiries continue to be answered as has been described above; but now the inquiry of whether the instruction cue flag is set is answered in the affirmative. Accordingly, the symbol INS is set (to be displayed), the symbol LTR is reset and numerical display 42 is conditioned to display the number of the instruction which has just been recorded. That is, a number corresponding to or derived from the address presently generated by the instruction cue memory address generator is condition to be displayed. Also, the display letter flag, which had been set when the letter cue flag had been sensed as being set, is reset and the letter timer flag (which is reset at the present time) is reset.

Then, the microprocessor continues through the flow charts shown in FIGS. 6B–6D, whereby the bar graph indication of the present position of the tape is displayed and the number of the instruction which is recorded also is displayed.

During succeeding cycles through the record routine, the inquiry of whether the count of the cue timer is equal to or greater than one second will be answered in the negative (it had been reset by the cue generate routine) until the cue timer times out. Once the cue timer reaches a count of one second, the record routine advances to inquire if the instruction cue address is full (that is, if the last available location in the instruction cue memory already has been addressed). It is assumed that this inquiry is answered in the negative and, since the shift flag is not set, the binary tape count is loaded from the binary tape counter into the instruction cue memory location that now is being addressed. Then, since the letter cue flag still is set, it now is reset and all of the cue flags, including the instruction cue flag, are reset. This completes the cue recording operation and, proceeding with the flow chart of FIG. 7A, since the count of the binary tape counter now is equal to the count just loaded into the instruction cue memory, the microprocessor returns to the beginning of the main loop.

In the next cycle of the microprocessor through the alphanumeric and tape direction routine after the instruction cue flag is reset, the inquiry of whether this flag is set is answered in the negative, and the following inquiry of whether the letter cue flag is set also is answered in the negative. Since the display letter flag had been reset during the preceding cycle through this routine, and since the "cue" display mode had not been selected, the symbols LTR and INS are cleared, and the numerical display now resumes the display of the present tape count.

Thus, when an instruction is recorded, the normal numerical display of the tape count is interrupted for the duration that the instruction cue flag is set (e.g. about one or one and one-half seconds, or more) and the number of the instruction that is recorded is displayed. Also, the symbol INS is displayed to apprise the user that numerical display 42 is displaying an instruction count. When the instruction cue flag is reset the normal tape count display is resumed.

It will be recognized that the bar graph display preferably is not affected by the recording of an instruction or the end of a letter. Rather, the bar graph display continues to display the approximate present position of the tape and the amount of tape that has been payed out from the supply reel.

If, after recording the "instruction" cue signal in the foregoing manner, further information is to be recorded on the tape, the microprocessor cycles through the record routine. Here, since the record flag is set but none of the cue flags are set, the cue signal indicating operation is not repeated until the next detection of the operation of cue button 30. So long as this button is not on, the cue stop flag remains set, inquiry is made as to whether the binary tape count is equal to the cue position count stored in the location which remains addressed by the cue memory address generator and, if not, whether any cue position counts stored in other cue memory locations are equal to the binary tape count. Then, if the tape has not yet been transported to its end zone region (i.e. if the last element of the bar graph is not energized), the record routine returns to the beginning of the main loop.

When the record button is released, device 10 is changed over to its stop mode, as described in the aforementioned copending application. Of course, the microprocessor continues to cycle through the bar graph display routine, wherein the inquiry of whether the bar graph is being displayed is answered in the affirmative, and through the alphanumeric and tape direction routine, wherein the tape count is displayed by numerical display 42 if the "cue" display mode has not been selected. However, if the user operates reset/mode button 32 for less than one second, this momentary operation is sensed by the reset button routine (FIG. 3) to change over the display mode to the "cue" display mode. Thereafter, when the microprocessor cycles through the alphanumeric and tape direction routine, the inquiry of whether the "cue" display mode has been selected will be answered in the affirmative and, if the display instruction cue position count flag is not set (this flag is set only when a recorded instruction is reached by fast forward or rewind movement of the tape), the symbol LTR will be set and numerical display 42 will be conditioned to display the number of the letter which was last-recorded or which is in position for play back (i.e. a number corresponding to or derived from the address presently generated by the letter cue memory address generator is displayed).

Let it now be assumed that the user wishes to review some of the information which he had just recorded. If the device had been disposed in its momentary record mode, the user first releases record button 24, thus disposing the device in its stop mode, and then rewind/play button 28 is operated. Alternatively, if the device had been operating in its conference record mode, the user may first operate stop button 26 to dispose the device in its stop mode, and then he may operate the rewind/play button.

The operation of rewind/play button 28 is detected when the microprocessor advances through its input routine, whereupon an in play flag is set to allow the device to change over to its playback mode upon the release of the rewind/play button, as described in aforementioned copending application Ser. No. 564,191. As a result of the operation of the rewind/play button, the microprocessor jumps to the rewind routine shown in FIG. 8.

On entering the rewind routine, the rewind flag is not set and, accordingly, suitable instructions are executed which effect the setting of this flag. Thereafter, upon subsequent cycles through the rewind routine, since the rewind flag now is set, the capstan reverse signal is set and, assuming the in erase flag is not set, the microprocessor advances to the cue pause routine. The purpose of the cue pause routine is to detect when the tape has been advanced or rewound to a location at which a cue signal had been recorded, whereupon further movement of the tape is temporarily interrupted. Preferably, when the location of a recorded instruction is reached, the display instruction cue position count flag is set. In this embodiment, and as will be described, when device 10 is in its rewind mode (e.g. the rewind flag is set), the alphanumeric and tape direction routine operates to display the symbol INS and the number of the instruction that has been accessed. In an alternative embodiment, this information is displayed only if the "cue" display mode has been manually selected.

During subsequent cycles of the microprocessor through the rewind routine, the tape continues to be driven reversely for so long as the rewind flag is set. As the tape is so driven, the BCD and binary tape counts are decremented during the tape counter update routines; and the underflow counter is incremented. As mentioned above, if the tape should break during the rewind operation, the underflow counter eventually will be incremented beyond a threshold value; and this is sensed by the tape counter update routine to turn off the capstan, set the EOT flag and set the tone counter to a count of ten. The user is apprised accordingly.

Also, during subsequent cycles of the microprocessor through the bar graph display routine, the inquiry of whether the bar graph is being displayed is answered in the negative. Hence, the separation between successive chopper pulse transitions is not measured and a bar graph element representing the present position of the tape is not set. During cycles of the microprocessor through the alphanumeric and tape direction routine, the inquiry of whether the capstan is being driven in reverse is answered in the affirmative, and the particular bar graph element that is set, or conditioned for energization, is decremented (from element "10" down to element "1" to element "10" again) once every 0.25 seconds. This provides the right-to-left shifting effect indicative of the tape rewind operation. Furthermore, continuing with this routine, since the device is not in its record mode and since the display letter flag is not set, the microprocessor advances to inquire if the "cue" display mode has been selected. This is answered in the affirmative if the reset/mode button 32 had been operated accordingly. As mentioned above, an affirmative answer also is provided if, while operating in the rewind mode, an instruction cue signal is reached. Then, assuming that an instruction cue signal has been reached, the display instruction cue position count flag will have been set and the symbol INS will be displayed as will the number of the instruction which has been reached. The latter is obtained by displaying a number corresponding to or derived from the address presently generated by the instruction cue memory address generator. This instruction number will be displayed for so long as the tape pauses, e.g. approximately one second. At that time, the display instruction cue position count flag is reset and, as shown in FIG. 6A, during succeeding cycles through the alphanumeric and tape direction routine, if the "cue" display mode had been selected, display 40 is controlled to display the symbol LTR and the number of the letter then in position for play back (e.g. a number corresponding to or derived from the address presently generated by the letter cue memory address generator).

As the tape continues to be rewound, the flow chart of FIG. 6A operates to control numerical display 42 to display the tape count (if the "tape count" display mode has been selected) or the number of the message then in position for play back (if the "cue" display mode has been selected). Advancing to the flow chart of FIGS. 6B and 6C, since the graph flag is not set, the particular bar graph element to which the alphanumeric and tape direction routine has been decremented is conditioned to be turned on (albeit, for only a 0.25 second interval, whereafter the routine is decremented to the next preceding bar graph element). Then, as shown in FIG 6D, since the device is not in its record or playback mode, the display is enabled to display the bar graph element, symbol and numerical indication determined above.

When the rewind/play button is released, device 10 changes over to its playback mode, as described in the aforementioned copending application. In this mode, the graph flag is set and the bar graph is displayed. As the microprocessor cycles through the bar graph display routine, the separation between successive chopper pulse transitions is measured, and the bar graph element selected by that measured separation is set. When the alphanumeric and tape direction routine is carried out, the bar graph element which is set is reflashed, and all preceding bar graph elements are turned on, as shown in FIGS. 6B-6C. Also, as shown in FIG. 6A, since the capstan is not being driven in reverse or fast forward, the graph flag is set. Since the device is not disposed in its record mode, inquiry is made of whether the display letter flag is set. This inquiry is answered in the negative and, depending upon the operation of reset/mode button 32, either the "tape count" mode or the "cue" mode is displayed. If the former, the present tape count is displayed. If the latter, the symbol LTR and the number of the message now being played back are displayed.

The play operation continues until the stop button, fast forward button, rewind button, momentary record button or conference button is operated. Let it be assumed that, while in the playback mode, the fast forward button is operated. This results in establishing the fast forward operation, as described in the aforementioned copending application. In this mode, the bar graph is not displayed. Rather, the alphanumeric and tape direction routine operates to increment the bar graph elements so as to set a successive element once every 0.25 seconds. This results in the left-to-right shifting effect. Also, and as was described in conjunction with the rewind operation, if the "cue" display mode is not selected, the tape count is displayed. However, if the "cue" display mode is selected, the number of the letter then in position for playback is displayed. In either display mode, when the tape has been advanced to the location at which an instruction was recorded (i.e. the binary tape count compares to a stored instruction cue position count) the number of that instruction is displayed.

From the preceding description, it is seen that, during a fast forward or rewind mode, whenever the tape has been transported to the location at which an instruction cue signal had been recorded, that is, whenever the binary tape counter reaches a count that is equal to a stored instruction cue position count, the number of this instruction is displayed for a brief duration on the order of about one second.

Now let it be assumed that the user wishes to erase information which he has previously recorded on the tape. This is achieved by operating rewind/play button 28 concurrently with cue/erase button 30. This may be done by operating the rewind/play button first and then, at a later time, operating the cue/erase button (referred to in the following description as the erase button), or by operating both buttons simultaneously. As a result, an erase operation is carried out which also effectively clears the cue memory of position counts identifying the locations of ends-of-letters and instructions when the tape has been rewound to those locations. This cue memory erase operation is carried out by the flow chart shown in FIG. 8.

Figure 8:
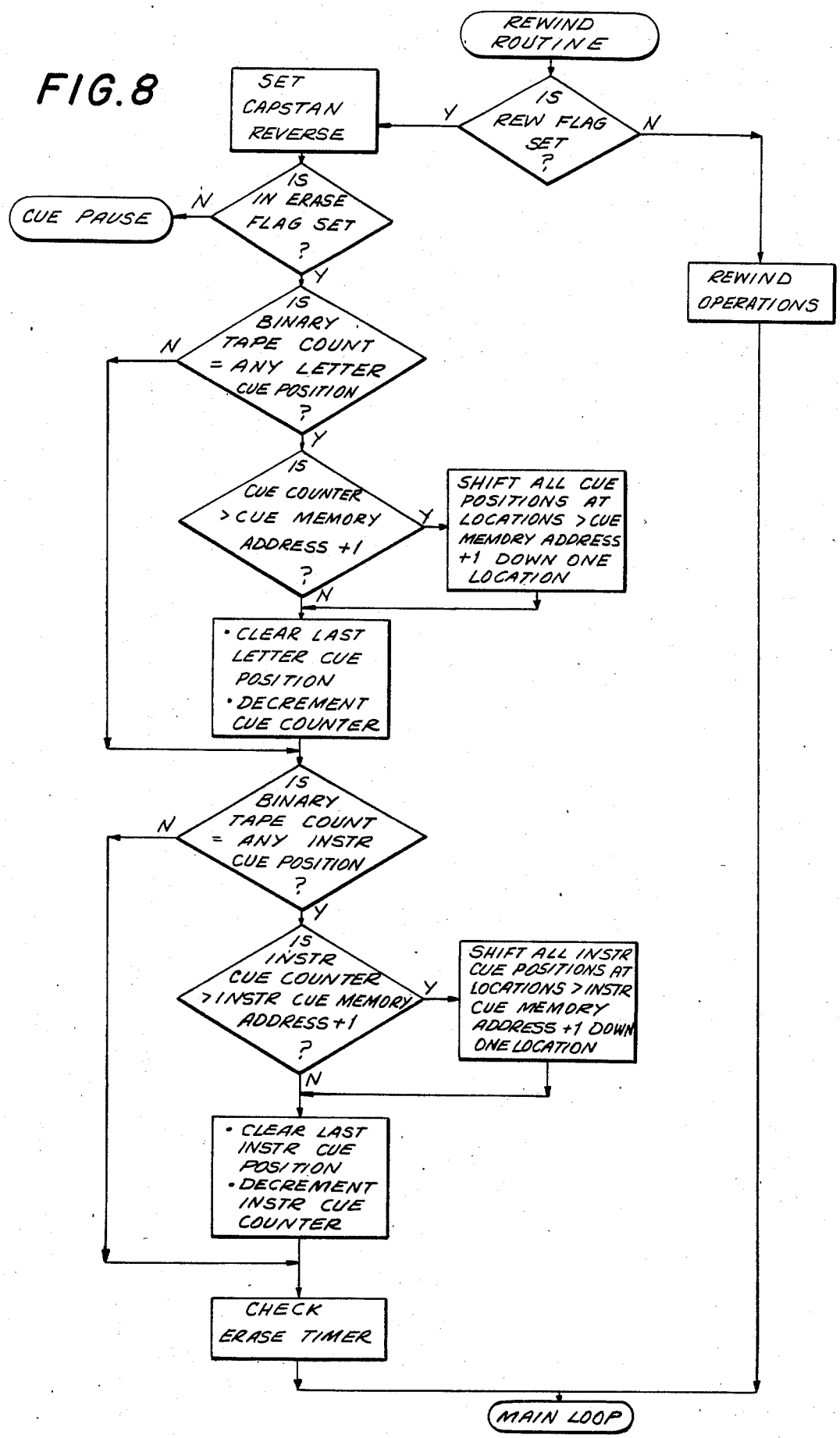

As shown in FIG. 8, the rewind and in erase flags now are both assumed to be set. Inquiry is made as to whether the count of the binary tape counter is equal to any stored letter cue position count. If this inquiry is answered in the affirmative, the routine advances to inquire if the count of the letter cue counter is greater than the letter cue memory address then being generated plus one (+1). From the reverse cue position routine represented by the flow chart of FIG. 4C, it is seen that, although the letter cue count normally corresponds with (e.g. is equal to) the letter cue memory address, when the tape is reversed the letter cue memory address is decremented whenever a previously recorded letter cue signal is reached. Hence, it is expected that during a rewind operation, when that previously recorded letter cue signal is encountered, the letter cue memory address will be decremented to be one less than the letter cue count. Therefore, when the binary tape count becomes equal to a stored letter cue position count, the letter cue count normally will be equal to the present letter cue memory address +1, and this inquiry will be answered in the negative. Then, the last (or highest occupied) letter cue location of the cue memory is cleared and the letter cue counter is decremented to a count that corresponds with (e.g. is equal to) the letter cue memory address. This effectively erases the last-recorded letter cue signal information (that is, the position count of that last-recorded letter cue signal) from the cue memory.

However, if a letter cue signal had been inserted between two previously-recorded letter cue signals, as when a previously-recorded letter is modified to be completed sooner than its original completion, the count of the letter cue counter may register, for example, "7" but, because of the revision to the previously-recorded letter, the letter cue memory address may be set to, for example, "5". This is described in detail below. In any event, if the tape is in the process of being erased before it had been sufficiently advanced to the position by which the letter cue count and the letter cue memory address are equal, the inquiry of whether the count of the letter cue count (e.g. "7") is greater than the letter cue memory address (e.g. "5") +1 will be answered in the affirmative. At that time, the routine advances to shift the position counts in those locations of the letter cue memory that are greater than the letter cue memory address +1 (that is, the position counts stored at letter cue memory locations "7" and above) down by one location. Then the position count stored in the highest-occupied location is cleared and the letter cue counter is decremented.

After the foregoing operation is completed, or if the binary tape count is not equal to any position count stored in the letter cue memory, inquiry is made to determine if the binary tape count is equal to any cue position count stored in the instruction cue memory.

The steps following this inquiry are quite similar to those described above with respect to the erasing of letter cue position counts and, in the interest of brevity, such steps are not described again.

Thus, as the tape is rewound, the binary tape count is continually compared to the stored letter and instruction cue position counts and the latter are erased from the cue memory when a positive comparison obtains. It will be appreciated that, during this erase operation, the bar graph display routine and the alphanumeric and tape direction routine operate as if the tape merely is being rewound. Since letter and instruction cue position counts are erased, the numbers of those letters and instructions will not subsequently be displayed when the tape, at a later time, is advanced to those locations at which the erased letters and instructions had been recorded. Thus, and as an example, let it be assumed that 7 letters had been recorded and letter number 7 is erased, thus clearing the position count from letter cue memory location "7". Let it be further assumed that, at a later time, the sixth letter is played back. After that sixth letter is played back, numerical display 42 will not display letter 7. Similarly, if three instructions had been recorded but instruction number 3 is erased, the numerical display will not display instruction 3 even if the tape subsequently is fast forwarded to the location at which instruction 3 had been recorded.

Let it now be assumed that, after recording a number of messages, or letters, some of which have specific instructions therein as indicated by the recording of instruction cue signals, the user wishes to revise the information that he had recorded. Let it be further assumed that, as a numerical example, seven letters have been recorded and three instructions also have been recorded. Hence, seven letter cue signals and three instruction cue signals are recorded, and the present count of the letter cue counter is equal to "7", the present letter cue memory address is set to "7", the present count of the instruction cue counter is equal to "3" and the present instruction cue memory address also is set to "3". If the "cue" display mode is selected, the alphanumeric and tape direction routine operates to display the symbol LTR and the number of the letter which had been last recorded, as described above with respect to the flow chart shown in FIG. 6A. To revise the information he has recorded, the user interrupts his dictation of the next message, or letter (i.e. the eighth letter), by operating rewind/play button 28. Accordingly, the rewind mode is established and display 40 is controlled in the manner described in detail hereinabove. The tape now is rewound.

With the rewinding of the tape, as the microprocessor cycles through the tape counter update routine, both the BCD and binary tape counters are decremented in response to each 1/0 chopper pulse transition, and the binary tape counter is additionally decremented in response to each 0/1 chopper pulse transition. After decrementing the binary tape counter (FIG. 4A), the reverse cue position routine (FIG. 4C) is carried out. Also, the alphanumeric and tape direction routine (FIGS. 6A-6D) effects a right-to-left shifting effect of the bar graph display. When the tape is sufficiently rewound such that the count of the binary tape counter is equal to the letter cue position count stored in letter cue memory location "7" (i.e. when the end of the seventh letter, or message, (or the beginning of the eighth) is reached), the inquiry (FIG. 4C) of whether the binary tape count is equal to any stored letter cue position count will be answered in the ffirmative. Hence, the letter cue memory address is decremented from "7" to "6". If the "cue" display mode had been selected, the numerical display will display letter number 6 until the end of the fifth (or beginning of the sixth) letter is reached. The next following inquiry (FIG. 4C) of whether the binary tape count is equal to any stored instruction cue position count is assumed to be answered in the negative. Accordingly, the reverse cue position routine exits to complete the remaining instructions of the tape counter update routine which, upon its completion, returns to the main loop.

It is recalled, from the foregoing discussion of the rewind routine, that the tape continues to be driven in the reverse direction for so long as the rewind button remains operated. Let it be assumed that, prior to reaching the end of the next preceding, or sixth, letter (or beginning of the present, or seventh, letter), whose position count is stored in location "6", the rewind button is released, thus disposing device 10 in its playback mode, as discussed above. Let it be further assumed that, after reviewing a portion of this message (the seventh letter), the user now wishes to modify that letter. Accordingly, momentary record button 24 (or conference record button 22) may be operated to dispose the device in its record mode. After the record flag is set, the next cycle of the microprocessor through the record routine results in carrying out the instructions represented by the flow chart shown in FIG. 7A. The inquiry of whether any cue flag is set is answered in the negative, the inquiry of whether the cue button is on also is answered in the negative, the inquiry of whether any cue signals are being recorded likewise is answered in the negative and the inquiry of whether the binary tape count is equal to the count stored in the letter cue memory now being addressed (e.g. address "6") also is answered in the negative. At this time, it is assumed that the user is revising letter "7" and, thus, the inquiry of whether the binary tape count is equal to any stored letter cue position count is answered in the negative. The next inquiry of whether the binary tape count is equal to any stored instruction cue position count also is answered in the negative and, since the tenth element of the bar graph is not energized, the microprocessor returns to the beginning of the main loop.

The foregoing cycle is repeated until, ultimately, the location on the tape at which the end of letter "7" had been recorded is reached. At that time, when the tape counter update routine cycles through the forward cue position routine (FIG. 4B), the inquiry of whether the binary tape count is equal to the stored letter cue position count is answered in the affirmative. That is, the binary tape count now is equal to the cue position count stored at letter cue memory location "7". Hence, the letter cue memory address is incremented from its count of "6" to the count of "7". Assuming that the binary tape count is not equal to any stored instruction cue position count, the forward cue position routine exits and the tape counter update routine is completed. The main loop continues to carry out the record routine. When the flow chart shown in FIG. 7A is executed, the inquiry of whether the binary tape count is equal to any stored letter cue position count ultimately will be made, and this inquiry now will be answered in the affirmative. Since the letter cue memory address had been incremented to the count of "7", the inquiry of whether the letter cue counter is greater than the letter cue memory address now is answered in the negative (it is recalled that the letter cue counter had been assumed to be set to a count of "7"). Hence, the last, or highest occupied, letter cue memory location is cleared, thus clearing the position count from letter cue memory location "7", and both the letter cue counter and letter cue memory address are decremented to the count of "6". This effectively erases the seventh letter cue signal information from the letter cue memory as is proper because new information has been recorded over this previously recorded letter cue signal.

It is assumed that the binary tape count is not equal to any stored instruction cue position count and, thus, the flow chart ultimately returns to the beginning of the main loop.

In the foregoing example, it had been assumed that letter "7" had been revised. Let it now be assumed that the user reverses the tape still further such that the letter cue memory address is decremented further to a count of "5" and then is still further decremented to a count of "4" by operation of the reverse cue position routine. This means that the user now is revising letter "5". Let it be further assumed that the instruction cue memory address is decremented, by the reverse cue position routine, from its count of "3" to a count of "2" and then to a count of "1". Once again, it is assumed that rewind/play button 28 is released and momentary record button 24 is operated. In the manner described above, the record routine is carried out and the record mode is initiated. Accordingly, the tape counter update routine, including the forward cue position routine, is carried out, and the record routine shown in FIG. 7A also is carried out.

If the user records over the location at which the second instruction cue signal had been recorded, the forward cue position routine increments the instruction cue memory address to the count of "2", and the flow chart shown in FIG. 7A is carried out. Since no cue flag is set, the cue button is not on, cue signals are not being recorded, the binary tape count is not equal to the count stored in the location now addressed in the cue memory, and the binary tape count is not equal to any stored letter cue position count, the microprocessor advances to inquire if the binary tape count is equal to any stored instruction cue position count. It is assumed, at this time, that the second instruction cue signal has been reached and, thus, the binary tape count now is equal to the instruction cue position count stored at instruction cue memory location "2". Hence, this inquiry is answered in the affirmative. The next inquiry of whether the instruction cue counter is greater than the instruction cue memory address also is answered in the affirmative, because it is assumed that the instruction cue count is equal to a count of 3. Hence, all instruction cue position counts that are stored in instruction cue memory locations which are greater than the present instruction cue memory address, that is, all instruction cue position counts stored at locations "3" and higher, are shifted down in the instruction cue memory by one location. That is, the cue position count stored in instruction cue memory location "3" is shifted into instruction cue memory location "2", thus replacing the instruction cue position count that had been stored at location "2". Then, the instruction cue position count stored in the last, or highest instruction cue memory location, that is, the position count stored at location "3" is cleared. Thereafter, the instruction cue counter is decremented from its count of "3" to the count of "2", and the instruction cue memory address is decremented from its count of "2" to the count of "1". Subsequently, the record routine returns to the beginning of the main loop.

As the user continues to record new information, that is, as the fifth letter continues to be revised, the location on the tape at which the fifth letter cue signal had been recorded is reached. At that time, the forward cue position routine (FIG. 4B) increments the letter cue memory address from its count of "4" to the count of "5". Assuming that no instruction cue signal had been recorded at this location, inquiry of whether the binary tape count is equal to any stored instruction cue position count is answered in the negative. The forward cue position routine thus exits and the tape counter update routine continues to be carried out.

When the record routine next is carried out, the microprocessor cycles through the flow chart shown in FIG. 7A. Ultimately, inquiry is made as to whether the binary tape count is equal to any stored letter cue position count. Since it is assumed that the binary tape count has been advanced to the position at which the fifth letter cue position count had been recorded, this inquiry is answered in the affirmative. The next inquiry of whether the cue counter (set to the count of "7") is greater than the letter cue memory address (now set to the count of "5") also is answered in the affirmative. Hence, all cue position counts that are stored in letter cue memory locations greater than or equal to the present letter cue memory address, that is, those position counts stored at location "7", "6" and "5" are shifted down one location, and the position count that had been stored at location "5" is discarded. Accordingly, the cue position counts stored at locations "7" and "6" are shifted into locations "6" and "5", respectively. Then, the position count stored in the last, or highest cue memory location, that is, the position count stored in location "7", is cleared. The cue counter then is decremented from its count of "7" to the count of "6", and the cue memory address is decremented from its count of "5" to the count of "4".

The foregoing operation is repeated each time that the tape advances to the location of a letter cue signal or the location of an instruction cue signal over which additional information is being recorded by the user. Hence, the cue memory is cleared of information relating to previously recorded letter and instruction cue signals when those signals are effectively erased by new information recorded thereover.

Let it now be assumed, consistent with the foregoing numerical example, that after seven letters and three instructions had been recorded, a modification is made to, for example, letter "5" such that this letter is shortened. This means that a letter cue signal (indicating the end of the fifth letter) is recorded before the previously recorded fifth letter cue signal is reached, and thus is inserted between the previously-recorded fifth letter cue signal and the previously-recorded fourth letter cue signal.

As described above, when the tape is rewound, the reverse cue position routine (FIG. 4C) operates to decrement the letter cue memory address and the instruction cue memory address each time a letter or instruction cue signal, respectively, is encountered. This has been discussed in detail hereinabove and, in the interest of brevity, is not repeated here. Thus, consistent with the previously described example, assuming that the tape has been rewound to enable the user to revise letter "5", the count of the letter cue memory address now is set to "4", the count of the letter cue counter remains set at "7", the count of the instruction cue memory address is set at "1" and the count of the instruction cue counter is set at "3".

After the user has modified letter "5" to his satisfaction, and prior to reaching the location of the previously recorded fifth letter cue signal, it is assumed that the user now operates cue/erase button 30 to record a letter cue signal indicating the end of revised letter "5". When the microprocessor next cycles through the record routine (FIG. 7A) the inquiry of whether the cue button is on now is answered in the affirmative. Since the cue stop flag had been set, the record routine advances to reset this flag and then proceeds to point C (FIG. 7B) where the inquiry of whether the instruction cue flag is set is answered in the negative. It is assumed that the letter cue flag is not set, and since the letter cue memory address now is equal to the count of "4", the next-following inquiry of whether this address is equal to nine is answered in the negative. However, the next inquiry of whether the count of the cue counter exceeds the count of the letter cue memory address is answered in the affirmative. Hence, the shift flag is set.

Proceeding with the flow chart shown in FIG. 7B, since the present count of the letter cue counter is equal to seven, the inquiry of whether this count is equal to nine is answered in the negative. Thus, the cue counter is incremented now to the count of eight. Then, among other flags, the letter cue flag is set. It is recalled that the setting of the letter cue flag results in the setting of the display letter flag in the alphanumeric and tape direction routine (FIG. 6A), which means that, once the letter cue flag is reset, the number of this letter (which is letter five) will be displayed. This is because, as will be described, before resetting the letter cue flag, the letter cue memory address will be incremented from "4" to "5", and it is this address (or a number derived therefrom) that is displayed by numerical display 42.

Commencing at point B (FIG. 7A), since a cue signal now is being recorded, the cue generate routine is executed. It is recalled that, during this routine, the cue timer is reset. Then, the inquiry of whether the binary tape count is equal to the position count stored in that location of the letter cue memory which presently is being addressed (i.e. location "4") is answered in the negative. The next inquiry of whether the binary tape count is equal to any stored letter cue position count also is answered in the negative. Proceeding with the flow chart of FIG. 7A, it is assumed that the binary tape count is not equal to any stored instruction cue position count and, since the tenth element of the bar graph display is not energized, the record routine exits to the beginning of the main loop.

As the letter cue signal is being recorded, the microprocessor continues to cycle through the aforedescribed portion of the flow chart shown in FIG. 7A until, ultimately, the cue timer times out, that is, until the count of the cue timer reaches the count corresponding to one second. At that time, when the record routine advances to the inquiry of whether any cue flag is set, this inquiry is answered in the affirmative and, likewise, the inquiry of whether the count of the cue timer is equal to or greater than one second also is answered in the affirmative. Then, the increment flag, which had not been set by the flow chart shown in FIG. 7B because the count of the cue counter exceeds the count of the letter cue memory address, is nevertheless reset, and the inquiry of whether the cue address is full (that is, whether the count of the letter cue address is equal to "9") is answered in the negative. Then, since the shift flag is set (it had been set by the operation of the flow chart of FIG. 7B), the next instruction is carried out to shift upward, by one location, all letter cue position counts that are stored at those locations which exceed the location now being addressed by the letter cue memory address. In accordance with the presently described numerical example, the letter cue position counts stored at locations "5", "6" and "7" now are shifted upward into locations "6", "7" and "8", respectively. Then, the letter cue memory address is incremented from its present count of "4" to the count of "5"; and the binary tape count is loaded into addressed letter cue memory location "5".

Once the count representing the location of this letter cue signal is stored in the letter cue memory, the shift flag is reset and, since the letter cue flag had been set, this flag now is reset too. The inquiry of whether the instruction cue flag is set is answered in the negative, and the cue timer is reset. The microprocessor then advances to point B of the flow chart, and the remainder of this flow chart is executed in the manner described above.

Thus, it is seen that, when a previously recorded letter is shortened, the position count of the new letter cue signal is inserted into the letter cue memory at a location occupied by the position count corresponding to the previously-recorded letter cue signal, and that position count, together with all position counts at higher letter cue memory locations are shifted upwarded. Stated otherwise, the new position is inserted into the storage location vacated by the previously-recorded position count which is shifted upward by one location in the letter cue memory. Also, the number in the sequence of recorded letters at which this letter is inserted (e.g. number 5) is displayed because the address generator has been incremented accordingly.

It will be appreciated that a similar shifting operation is carried out in the event that letter "5" is lengthened beyond its previous length. That is, as the revision of letter "5" continues, when the location of the fifth letter cue signal is reached, the position count stored in location "5" of the letter cue memory is discarded, and the position counts stored at locations "6" and "7" are shifted down into locations "5" and "6", respectively, as has been described above. Then, when a letter cue signal is recorded to indicate the end of the revised letter "5", the position counts now stored at locations "5" and "6" are shifted upward into locations "6" and "7", respectively, and the binary tape count present at the time that the cue timer times out is shifted into vacated location "5", in the manner described above.

If, prior to reaching the second instruction cue signal recorded on the tape, the user operates cue/erase button 30 to record another instruction cue signal, a similar shifting operation is carried out in the instruction cue memory. Assuming that the microprocessor cycles through the record routine, and that the record flag is set, the inquiry of whether a cue flag is set is answered in the negative (it is assumed that this is the first operation of the cue button). Since an instruction cue signal is in the process of being recorded, the inquiry of whether the cue button is on now is answered in the affirmative. The cue stop flag had been set and, proceeding with the flow chart, this flag now is reset and the record routine advances to point C of FIG. 7B.

The inquiry of whether the instruction cue flag is set is answered in the negative and, similarly, the inquiry of whether the letter cue flag is set also is answered in the negative. It is assumed that the cue memory address is less than "9", and it is further assumed that the count of the cue counter exceeds the count of the cue memory address. Hence, the shift flag is set and, assuming that the count of the cue counter is less than "9", this count is incremented. Accordingly, and as described above, various flags including the letter cue flag are set. The record routine then advances to point B (FIG. 7A).

The inquiry of whether a cue signal is being recorded is answered in the affirmative and the microprocessor advances to the cue generate routine. Assuming that the binary tape count is not equal to the position count stored in the addressed location of the cue memory, and that this binary tape count is not equal to any stored letter or instruction cue position signal, the record routine merely continues and returns to the beginning of the main loop.

On succeeding cycles of the microprocessor through the record routine, the flow chart shown in FIG. 7A is carried out, by which the inquiry of whether any cue flag is set is answered in the affirmative, the inquiry of whether the cue timer has timed out is answered in the negative, the inquiry of whether the cue button is on is answered in the affirmative and the inquiry of whether the cue stop flag is set is answered in the negative. The record routine thus arrives at point B, and the remainder of the flow chart shown in FIG. 7A is repeated in the manner described above.

It is recalled that, in order to record an instruction cue signal, the cue/erase button must be released prior to the time that the cue timer times out, and then this cue button must be re-operated. When the microprocessor next cycles through the record routine, let it be assumed that the cue button has been released. Hence, as shown in FIG. 7A, the inquiry of whether the cue button is on is answered in the negative, and the cue stop flag now is set. When the cue button is re-operated, the next cycle of the record routine following that re-operation answers the inquiries of whether a cue flag is set in the affirmative, whether the cue timer has timed out in the negative, whether the cue button is on in the affirmative and whether the cue stop flag is set in the affirmative. Hence, the cue stop flag is reset and the record routine advances to point C (FIG. 7B). Since the instruction cue flag is not set but the letter cue flag is, inquiry is made as to whether the increment flag is set. From the preceding discussion, it is recalled that this flag is not set and, thus, the shift flag is reset, and the record routine advances to inquire if the instruction cue memory address is equal to "9". In accordance with the present example, this inquiry is answered in the negative. The next-following inquiry of whether the instruction counter exceeds the count of the instruction cue memory address is answered in the affirmative because it has been assumed that the present count of the instruction cue memory address is equal to "1" and the present count of the instruction cue counter is equal to "3". Thus, all position counts at locations in the instruction cue memory which exceed the location now being addressed are shifted upward by one location. That is, the position counts stored in locations "2" and "3" in the instruction cue memory are shifted upward into locations "3" and "4", respectively, thus vacating location "2". Then, the instruction cue memory address is incremented to the count of "2" and, since the count of the instruction cue counter has been assumed to be less than "9", it is incremented from its count of "3" to the count of "4". Next, the cue memory address is set equal to the instruction cue memory address and the instruction cue flag is set. It is recalled that this, in turn, allows the number of the instruction which has been recorded (i.e. the second instruction in the sequence recorded on the tape) to be displayed. A number corresponding to or derived from the present instruction cue memory address of "2" is displayed.

Next, the record routine returns to point B of FIG. 7A, and the remainder of this flow chart is repeated in the manner discussed above. Until the cue timer times out, the flow chart shown in FIG. 7A is executed each time the microprocessor cycles through the record routine. Ultimately, when this routine is carried out, the inquiry of whether the cue timer has timed out is answered in the affirmative. At that time the increment flag, although not set, is reset, and the inquiry of whether the cue memory address is full is answered in the negative. The next inquiry of whether the shift flag is set also is answered in the negative (it had been reset during the last cycle through the flow chart shown in FIG. 7B) and the record routine advances to load the binary tape count into location "2" of the instruction cue memory, which location now is being addressed by the instruction cue memory address. Then, the shift flag is reset (it had not been set) and, since the letter cue flag still is set, it now is reset. The inquiry of whether the instruction cue flag is set is answered in the affirmative and, thus, all cue flags (including this instruction cue flag) are reset. The remainder of the flow chart shown in FIG. 7A then is executed in the manner that has been described previously.

Thus, it is seen that, when a letter or instruction cue signal is inserted between two previously recorded letter or instruction cue signals, the position count corresponding to the inserted cue signal is similarly inserted into the proper position of the cue memory. If the previously recorded cue signal is not "overwritten" by new information, the position counts of those previously recorded cue signals are retained in the cue memory for display. The number of the letter or instruction which has just been inserted is displayed.

In the numerical examples described above, it will be appreciated that the position counts of up to nine letter cue signals and the position counts of up to nine instruction cue signals may be stored in the letter and instruction cue memories, respectively. Of course, a greater number of cue signals may be recorded, but the position counts of such additional cue signals are not stored. If desired, any greater or lesser number of position counts may be stored in the cue memory. Also, ten bar graph elements 44 are provided, each representing a length of tape upon which three minutes of dictation may be recorded. A greater number of elements may be used, if desired.

While the present invention has been particularly shown and described with reference to a preferred embodiment, it will be readily appreciated by those of ordinary skill in the art that various changes and modifications in form and details may be made without departing from the spirit and scope of the invention. For example, the letter and instruction cue position counts may be stored in address locations 101, 102, etc., and the number of the letter or instruction which has been recorded, or the number of the message which is in position for playback, or the number of the instruction which has been reached by rewinding or fast forwarding the tape may be derived from the present memory address being generated merely by subtracting a constant (e.g. 100) therefrom. Also, it is seen that, if locations "1", "2", etc. are used, and if the position count representing the end of letter 1 is stored in location "1", then, by operation of the reverse cue position routine, the letter cue memory address generator will generate the address "0" while the first letter is played back and until the end thereof is reached. Numerical display 42 may, nevertheless, display numeral "1" at this time by adding the constant 1 to the letter cue memory address being generated. Alternatively, the initial letter and instruction cue memory addresses, that is, the addresses which are preset when, for example, a fresh cassette is loaded into the device may be the address "1" rather than "0".

It will be recognized that the sequence of instructions in the respective routines, and the sequence of routines themselves, may be altered, as desired. Still further, although the device, in its preferred form, operates as a record/playback device, such as a dictate machine, it also may be used merely as a playback device having the aforementioned displays. Moreover, the displays may be formed of LED devices, if battery drainage is not a problem.

Furthermore, it is seen that the locations of letters, messages or instructions are detected and displayed without requiring the actual sensing of a "letter" or "instruction" cue signal on the record medium. Rather, a count representing the location of that letter, message or instruction on the medium is stored, and a tape count representing the instantaneous position of the medium is compared thereto. A positive comparison indicates that the letter, message or instruction has been reached.

It is intended that the appended claims be interpreted as including the foregoing as well as other various changes.

What is claimed is:

1. In a device for recording on and/or playing back messages and instruction from a movable record medium, and operable to produce end-of-message and instruction cue signals, respectively, and including means for producing numerical data representing the locations along said record medium at which an end-of-message message or an instruction is recorded, said device including: a common variable mode alphanumeric display means operable in mutually exclusive first and second modes to display a numerical representation of the present position of said record medium in said first mode and to display an indication of whether an end-of-message or an instruction has been recorded or reached on said record medium and a numerical representation of the number of that message or instruction in said second mode, and comprising counter means selectively incremented and decremented as said record medium advances and reverses, respectively; cue memory means for storing data corresponding to the position and number on said record medium of respective ends-of-messages and instructions; and manually operable selector means for selecting the display mode of said common display means to display at least a portion of the count of said counter means in said first mode and the number and indication of the end-of-message or instruction that has been recorded or reached in said second mode.

2. In a device for recording on and/or playing back messages from a movable record medium and operable to produce identifiable cue signal indications representing the locations along said record medium at which predetermined information is recorded, said device including: a common variable mode alphanumeric display means operable in one mode to display a numerical representation of the present position of said record medium and operable in a second mode to display numerical representations and identifications of said cue signal indications and comprising counter means selectively incremented and decremented as said record medium advances and reverses, respectively; cue memory means for storing data corresponding to the position on said record medium of respective cue signal indications; said cue memory means comprising addressable storage locations for storing the counts of said counter means representing the location at which said predetermined information is recorded on said record medium, means for causing said counts to be stored in sequential storage locations, and address generating means increments when a new cue signal indication is provided and also incremented and decremented when said record medium is advanced and reversed respectively, past a location at which said predetermined information is recorded; and manually operable selector means for selecting the display mode of said common display means to display at least a portion of the count of said counter means in said one mode and the numerical representation and identification of the cue signal indication in said second mode.

3. The invention of claim 2 wherein said common display means is responsive to the selected operation of said selector means to display a numerical representation of the address generated by said address generating means.

4. The invention of claim 3 further comprising means for comparing the present count of said counter means to the counts stored in said addressable storage locations of said cue memory means; means for incrementing said address generating means in response to a comparisor of the count of said counter means and a stored count if said record medium is being advanced; and means for decrementing said address generating means in response to a comparison of the count of said counter means and a stored count if said record medium is being reversed.

5. The invention of claim 4 wherein said cue signal indications include "letter" cue indications representing the locations at which ends-of-letters are recorded and "instruction" cue indications representing the location at which instructions are recorded; wherein said cue memory means includes a "letter" cue section for storing counts representing the locations at which ends-of-letters are recorded and an "instruction" cue section for storing counts representing the locations at which instructions are recorded; wherein said address generating means includes a "letter" cue address section for addressing the "letter" cue section of said cue memory means and an "instruction" cue address section for addressing the "instruction cue section of said cue memory means; and wherein said display means is operable to display a predetermined "letter" indication together with the numerical representation of the address generated by said "letter" cue address section and, when said record medium is advanced or rewound to a location at which an instruction is recorded, to interrupt said last-mentioned display to display, for a predetermined duration, a predetermined "instruction" indication together with the numerical representation of the address generated by said "instruction" cue address section.

6. The invention of claim 5, further including means for disposing said device in a record mode for recording information, ends-of-letter indications and instructions on said record medium; and wherein said display means displays for a pre-established duration said predetermined "instruction" indication together with said numerical representation of the address generated by said "instruction" cue address section when an instruction is recorded.

7. The invention of claim 6 wherein said display means displays for a preset time duration said predetermined "letter" indication together with said numerical representation of the address generated by said "letter" cue address section when an end-of-letter indication is recorded.

8. The invention of claim 7 further comprising cue memory shift means responsive to the recording of an additional end-of-letter indication or an additional instruction intermediate two previously recorded end-of-letter indications or instructions, respectively, to shift by one storage location those counts which are greater than the present count of said counter means, thereby vacating a storage location; means for loading said present count of said counter means into said vacated storage location, and means for setting the address of said "letter" or "instruction" cue address section, respectively, to said vacated storage location.

9. In a device for recording on and/or playing back messages from a bidirectionally movable magnetic tape extending between supply and take-up reels whose respective angular velocity varies as a function of the amount of tape thereon; said device including pulse generating means coupled to one of said reels for generating pulses at a repetition rate determined by the angular velocity of said one reel; timing means for timing the interval separating successive pulses and for producing interval counts representing timed intervals; plural display elements arranged as a bar graph display; and display control means for energizing at least one of said display elements as a function of the interval count produced by said timing means to display the relative position of said tape between said reels; said device being operable to produce identifiable cue signal indications representing the locations along said record medium at which predetermined information is recorded, and said device further including a common variable mode alphanumeric display means operable in one mode to display a numerical representation of the present position of said record medium and operable in a second mode to display numerical representations and identifications of said cue signal indications and comprising counter means selectively incremented and decremented as said record medium advances and reverses, respectively; cue memory means for storing data corresponding to the position on said record medium of respective cue signal indications; and manually operable selector means for selecting the display mode of said common display means to display at least a portion of the count of said counter means in said one mode and the numerical representation and identification of the cue signal indication in said second mode.

10. The invention of claim 9 wherein said display control means energizes successive display elements as said tape moves from one reel to the other.

11. The invention of claim 10 wherein the next successive display element is energized when said interval count changes from one predetermined value to another, as said tape is advanced, and said display control means is operable to maintain the preceding display elements energized.

12. The invention of claim 11 wherein said timing means includes averaging means for averaging a predetermined number of successive interval counts to produce an average interval count for determining the display elements which are energized.

13. The invention of claim 12 wherein said display control means is operable to flash the display element determined by said average interval count.

14. A device for playing back messages, such as letters, recorded on a movable record medium and comprising counter means selectively incremented and decremented as said record medium advances and reverses, respectively, to provide a count representing the present position of said record medium; memory means comprising addressable storage locations in which counts identifying the relative locations of the ends of said messages are stored, said memory menas providing information representing the number of messages that have been recorded on said record medium; variable mode display means operable in one mode to provide a numerical display of the count of said counter means and operable in a second mode to provide a numerical display of the number corresponding to the storage location in which is stored the count that compares to the count of said counter means; manually operable selector means for selecting the display mode of said display menas; and count comparison means for comparing the count of said counter means to the counts stored in said addressable storage locations of said memory means to sense when said record medium is transported to play back the next message.

15. The device of claim 14 further comprising memory address generating means for addressing said memory means and for supplying to said display means a number corresponding to the address generated thereby for display of the number of the message being played back; means for incrementing said memory address generating means when said record medium is advanced and the count of said counter means compares to a count stored in said memory means; and means for decrementing said memory address generating means when said record medium is reversed and the count of said counter means compares to a count stored in said memory means.

16. The device of claim 15 further comprising means for transporting said record medium at relatively high speed and for selecting said second display mode to display the numbers of said messages that have been reached when said record medium is so transported.

17. A device for playing back from a movable record medium messages having instructions inserted therein, and comprising counter means selectively incremented and decremented as said record medium advances and reverses, respectively, to provide a count representing the present position of said record medium; memory means in which counts identifying the relative locations of the instructions on said record medium are stored, said memory means providing information representing the number of instructions that have been recorded on said recored medium; variale mode display means operable in first and second mutually exclusive modes to provide in said first mode a numerical display of the count of said counter means and to provide in said second mode a numerical display of the number of the instruction that has been reached; display control means for controlling said display means to display, for only a fixed predetermined time duration the number of the instruction that has been reached; and count comparison means for comparing the count of said counter means to a count stored in said memory means to sense when said record medium has reached an instruction.

18. The device of claim 17 wherein said memory means is comprised of addressable storage locations for storing said counts therein; and wherein said display means, when in said second mode, displays a number corresponding to the storage location in which is stored the count that compares to the count of said counter means.

19. The device of claim 18 additionally comprising memory address generating means for addressing said memory means and for supplying to said display means a number corresponding to the address generated thereby for display of the number of the instruction that has been reached; means for incrementing said memory address generating means when said record medium is advanced and the count of said counter means compares to a count stored in said memory means; and means for decrementing said memory address generating means when said record medium is reversed and the count of said counter means compares to a count stored in said memory means.

20. The device of claim 19, further comprising means for transporting said record medium at relatively high speed and for selecting said second display mode to display the numbers of said instructions that have been reached when said record medium is so transported.

21. The device of claim 18 wherein said memory means includes a section for storing counts identifying the relative locations of the ends of said messages; and wherein said count comparison means is additionally operative to compare the count of said counter means to the counts stored in said section to sense when the record medium is transported to play back the next message; and further comprising manually operable selector means for selecting the display mode of said display means, such that when in said second display mode, said display means normally displays the number of the message being played back until an instruction is reached.

22. A device for recording messages, such as letters, on a movable record medium, and comprising counter means selectively incremented and decremented as said record medium advances and reverses, respectively, to provide a count representing the present position of said record medium; end-of-message means operable to indicate the end of recorded nessage; means for providing information representing the number of ends of messages that have been indicated and variable mode alphanumeric display means normally operable in one mode to display a numerical representation of the count of said counter means and responsive to the operation of said end-of-message means to interrupt the normal display of said count and to display, for a predetermined time duration, a numerical representation of the number of the message that was last recorded.

23. The device of claim 22 wherein said display means responds to the termination of the operation of said end-of-message means to display the number of the message that was last recorded.

24. The device of claim 22 wherein said messages are recorded in sequence and said device is further operable to record a new message over a previously recorded message on said record medium, said new message extending beyond the end of said previously recorded message, and including display control means responsive to the operation of said end-of-message means for controlling said display means to display the number of the new message in the sequence in which it is on said record medium.

25. The device of claim 24 wherein said display control means comprises memory means having addressable locations for storing counts identifying the relative locations of the ends of messages that have been recorded; memory address generating means for addressing successive memory locations into which the count identifying the relative location of the end of a message is loaded, and for supplying to said display means a number corresponding to the address generated thereby for displaying the number of the message that was last recorded; means for incrementing said memory address generating means when said end-of-message means is operated or when said record medium is advanced and the count of said counter means compares to a count stored in said memory means; means for decrementing said memory address generating means when said record medium is reversed and the count of said counter means compares to a count stored in said memory means; and means for clearing a count from said memory means when a new message is recorded over the location of said record medium represented by that count and for decrementing said memory address generating means.

26. A device for recording messages on a movable record medium, and comprising counter means selectively incremented and decremented as said record medium advances and reverses, respectively, to provide a count representing the present position of said record medium; instruction means operable to indicate the recording of an instruction on said record medium; means for providing information representing the number of instructions that have been recorded; and variable mode display means normally operable in one mode to display a numerical representation of the count of said counter means and responsive to the operation of said instruction means to interrupt the normal display of said count and to display, for a predetermined time duration, a numerical representation of the number of the instruction that was last recorded.

27. The device of claim 26 wherein said instructions are recorded in sequence, and wherein said device is operable to record a new instruction intermediate locations on said record medium at which previously-recorded instructions are recorded; and including display control means responsive to the operation of said instruction means for controlling said display means to display the number of the new instruction in the sequence in which it is on the record medium.

28. In a record and/or playback device having a bidirectionally movable magnetic tape extending between supply and take-up reels whose respective angular velocity varies as a function of the amount of tape thereon, pulse generating means coupled to one of said reels for generating pulses at a repetition rate determined by the angular velocity of said one reel; processor means for timing the interval separating successive pulses and for producing averaged interval counts representing such intervals; plural display elements arranged as a bar graph display to indicate the present relative position of said tape; and display control means for energizing at least one of said display elements as a function of the averaged interval count produced by said processor means, said at least one display element representing the present relative position of said tape.

29. The invention of claim 28 wherein said display control means energizes successive display elements as said tape moves from one reel to the other.

30. The invention of claim 29 wherein said display means is further operative to maintain the energization of those display elements which precede said one display element when said tape is advancing.

31. The invention of claim 30 wherein said timing means includes averaging means for averaging a predetermined number of interval counts to provide an average interval count; and wherein said display control means energizes said display elements as a function of said average interval count.

32. The invention of claim 31 wherein said display control means includes means for sensing if said average interval count fails within predetermined count ranges for energizing a display element corresponding to the count range into which said average interval count falls.

33. The invention of claim 29 wherein said display control means includes means for successively energizing sequential ones of said display elements to provide a visual shifting effect representing the direction in which said magnetic tape is moving when said tape is driven rapidly in the forward or reverse direction.

34. In a device for recording on and/or playing back from a movable record medium messages and instructions, a processor-controlled common variable mode alphanumeric display comprising a numercal display operable in one mode to display a numerical count representing the present position of said record medium and in a second mode to display the number of the message which was last recorded or which is in position for play back, said numerical display being further operable in a third mode to display the number of an instruction being recorded or the number of the recorded instruction that has been reached; counter means selectively incremented and decremented as said record medium advances and reverses, respectively; bar graph display means operable to display a bar graph representation of the present position of said record medium; pulse generating means responsive to the movement of said record medium for generating pulses; and processor means for controlling said counter means and said bar graph display means in accordance with said pulses, said processor means further controlling said numerical display to display numerical representations of the position of said record medium determined from said counter means, or numerical representations of the number of said messages or said instructions in accordance with the operating mode of said display.

35. The invention of claim 34 wherein said processor means includes message counting means for counting each message that is recorded on said record medium and message tracking means for tracking the number of the particular message that is being played back from said record medium.

36. The invention of claim 35 wherein said processor means controls the operating mode of said numerical display to normally display in said one mode the count of said counter means and to interrupt the normal display of said count of said counter means to display in said second mode the number of the message that has just been recorded.

37. The display of claim 36 further including selecting means operable to select said second display mode; said processor means being responsive to said selecting means to control said numerical display to display the number of the message then in position for playback.

38. The invention of claim 37 wherein said processor means includes instruction counting means for counting each instruction that is recorded on said record medium and instruction indicating means for indicating the number of the instruction that has been reached.

39. The invention of claim 38 wherein said processor means controls the operating mode of said numerical display to normally display in said one mode the count of said counter means and to interrupt the normal display of said count of said counter means to display in said third mode the number of the instruction being recorded.

40. The invention of claim 39 wherein said record medium is selectively movable at a relatively high speed; and wherein said processor means controls said numerical display to display the number of the instruction that has been reached by the high speed movement of said record medium.

41. The invention of claim 34 wherein said processor means includes means for timing the interval separating successive pulses to produce an interval count representing said interval, said interval count varying as a function of the present position of said record medium; wherein said bar graph display means is comprised of plural energizable display elements; and wherein said processor means energizes at least one of said display elements as a function of said interval count.

42. The invention of claim 41 wherein said processor means energizes successive ones of said display elements as said record medium advances while maintaining the energization of preceding display elements, 43. The invention of claim 42 wherein said means for timing the interval separating successive pulses includes averaging means for averaging a predetermined number of interval counts to provide an average interval count; and said processor means energizes the next successive display element in accordance with said average interval count.

44. The invention of claim 41 wherein each display element is associated with an approximate incremental amount of said record medium; and wherein said processor means includes means for sensing when a predetermined one of said display elements is energized, and means responsive to the energization of said predetermined display element to indicate that only a pre-established amount of said record medium remains available for recording further messages thereon.

45. The invention of claim 44 wherein said predetermined display element is the last display element.

46. In a record and/or playback device having an addressable memory and moving means for moving an addressable memory and moving means for moving a bi-directional movable record medium on which messages are recorded, a method of locating respective messages comprising the steps of storing location counts in successive memory addresses representing the respective locations at which messages are recorded on said record medium; moving the medium; providing a position count representing the present position of said record medium; comparing the provided position count of said record medium to the stored location counts of said messages; indicating a positive comparison of said position count to a location count, thereby locating a respective message; updating a memory address in response to a positive comparison; deriving a message number count from said updated memory address; and displaying the message number count of the respective message that had been located.

47. The method of claim 46 wherein said step of providing a message number count comprises generating a memory address for addressing said memory locations; and wherein the step of updating said memory address comprises incrementing said memory address in response to a positive count comparison when said record medium is advanced, and decrementing said memory address in response to a positive count comparison when said record medium is reversed.

48. The method of claim 46, further comprising the steps of generating pulses as said record medium moves, measuring the separation between successive ones of said pulses, and displaying a bar graph representation of the present position of said record medium as a function of the measured pulse separation by energizing at least one of plural energizable display elements as determined by said measured separation.

* * * * *